May 16, 1967 W. G. LAIRD ET AL 3,320,363

SYSTEM FOR PRINTING AND TELEVISING

Filed Feb. 21, 1966 9 Sheets-Sheet 1

INVENTORS
WILLIAM G. LAIRD
DONALD W. JOHNSTON
LYLE O. KEYS
DONALD L. McCLELLAN

*Lynn G. Foster*
ATTORNEY

May 16, 1967  W. G. LAIRD ETAL  3,320,363
SYSTEM FOR PRINTING AND TELEVISING
Filed Feb. 21, 1966  9 Sheets-Sheet 2
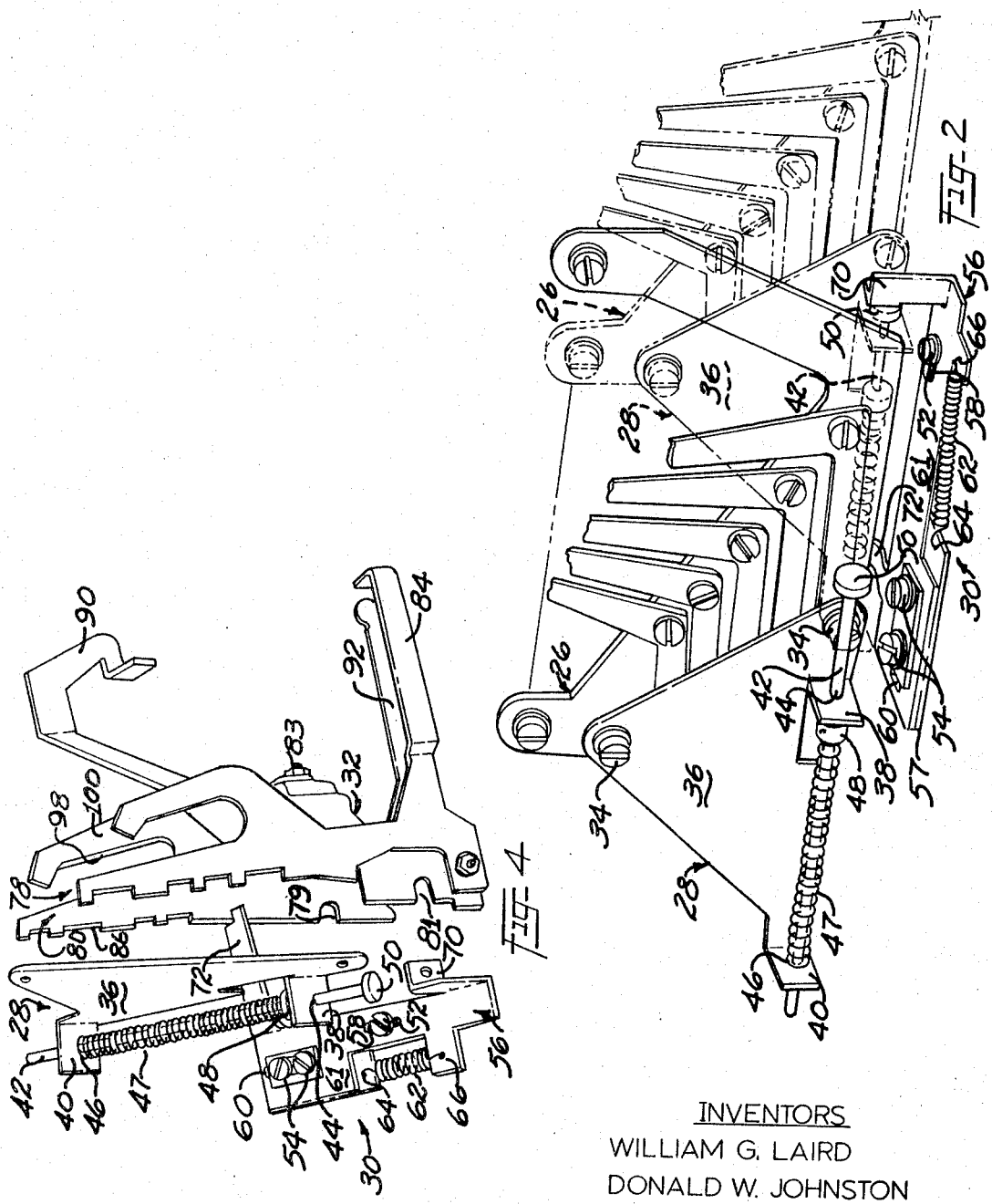
INVENTORS
WILLIAM G. LAIRD
DONALD W. JOHNSTON
LYLE O. KEYS
DONALD L. McCLELLAN
Lynn D. Foster
ATTORNEY

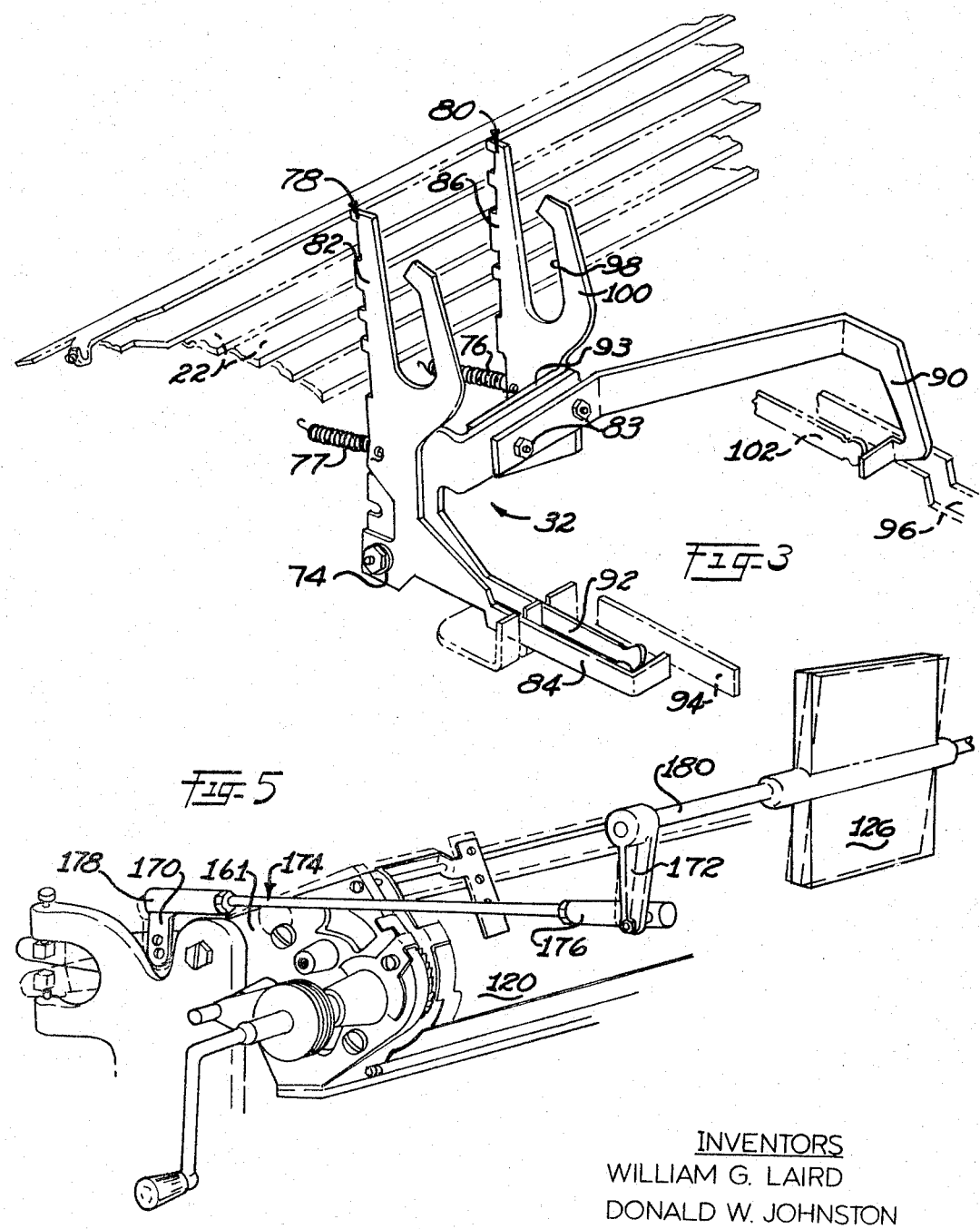

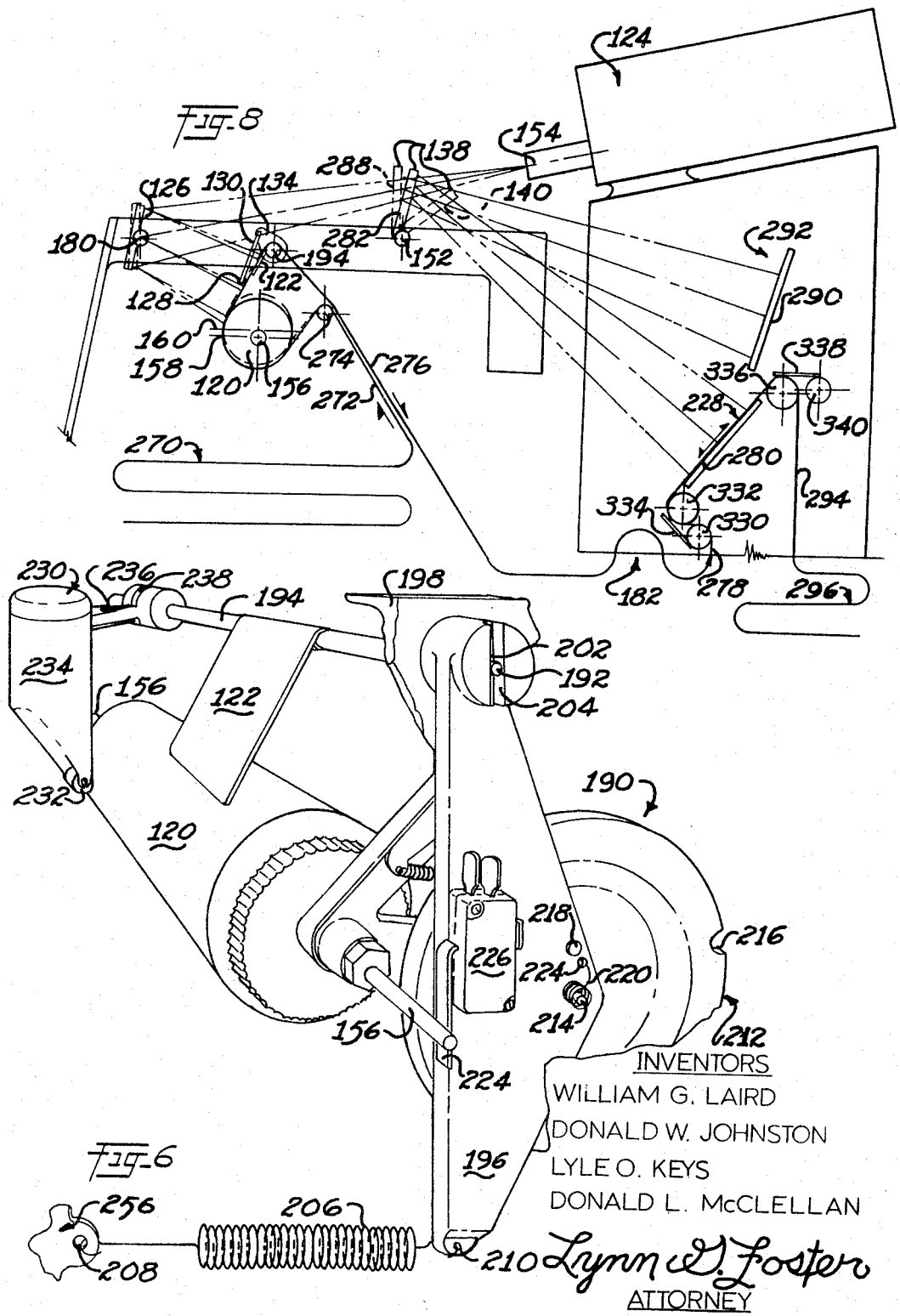

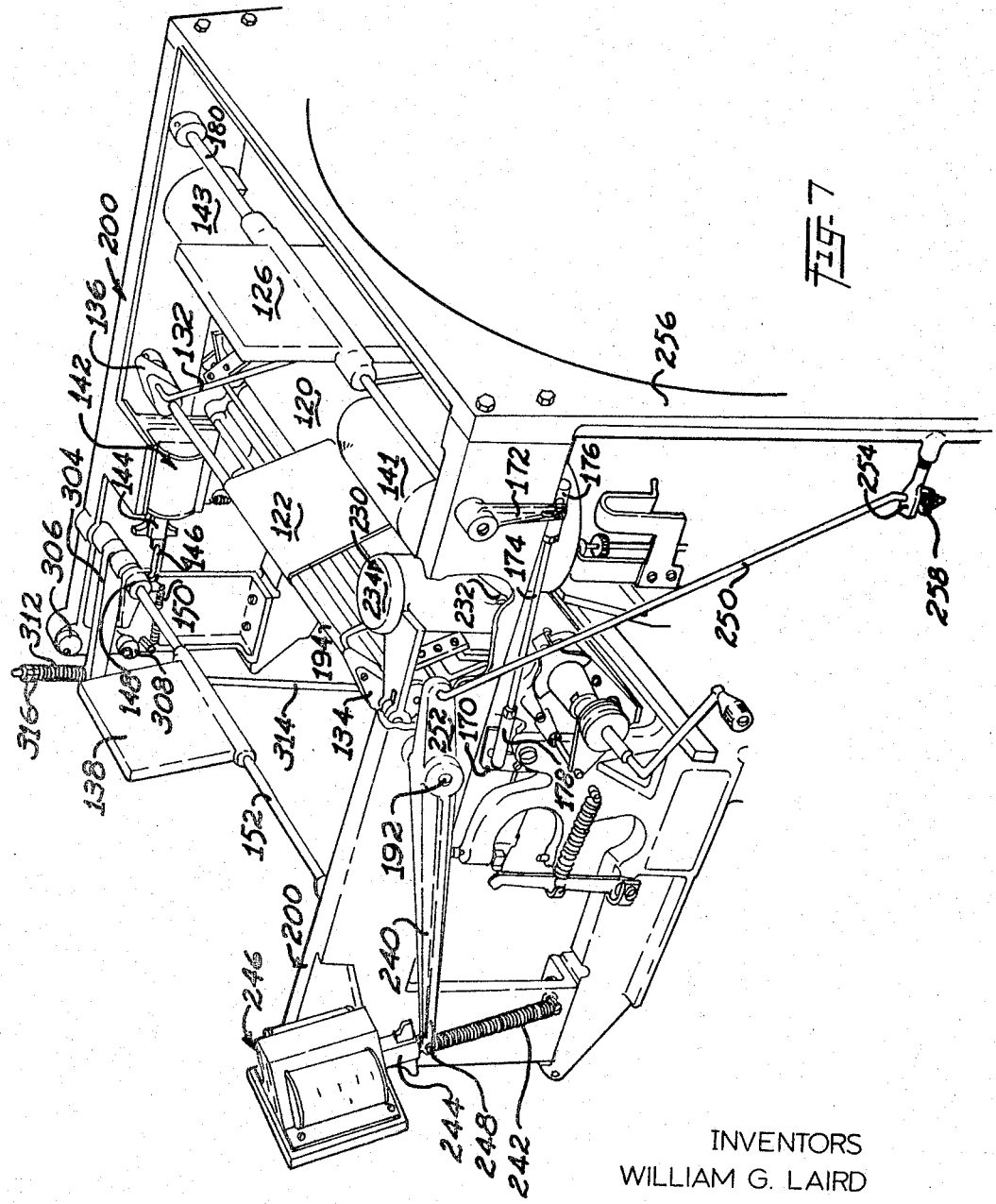

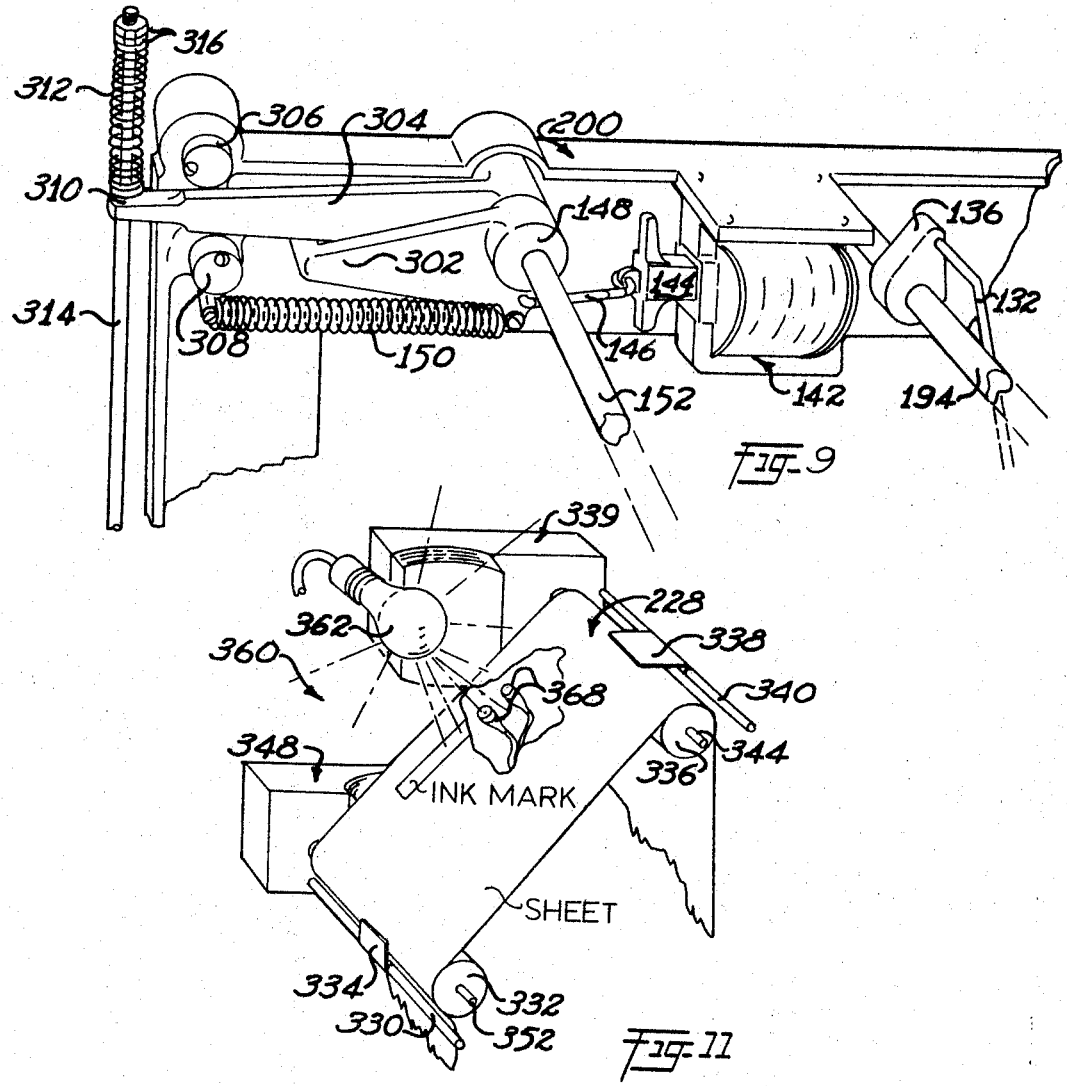

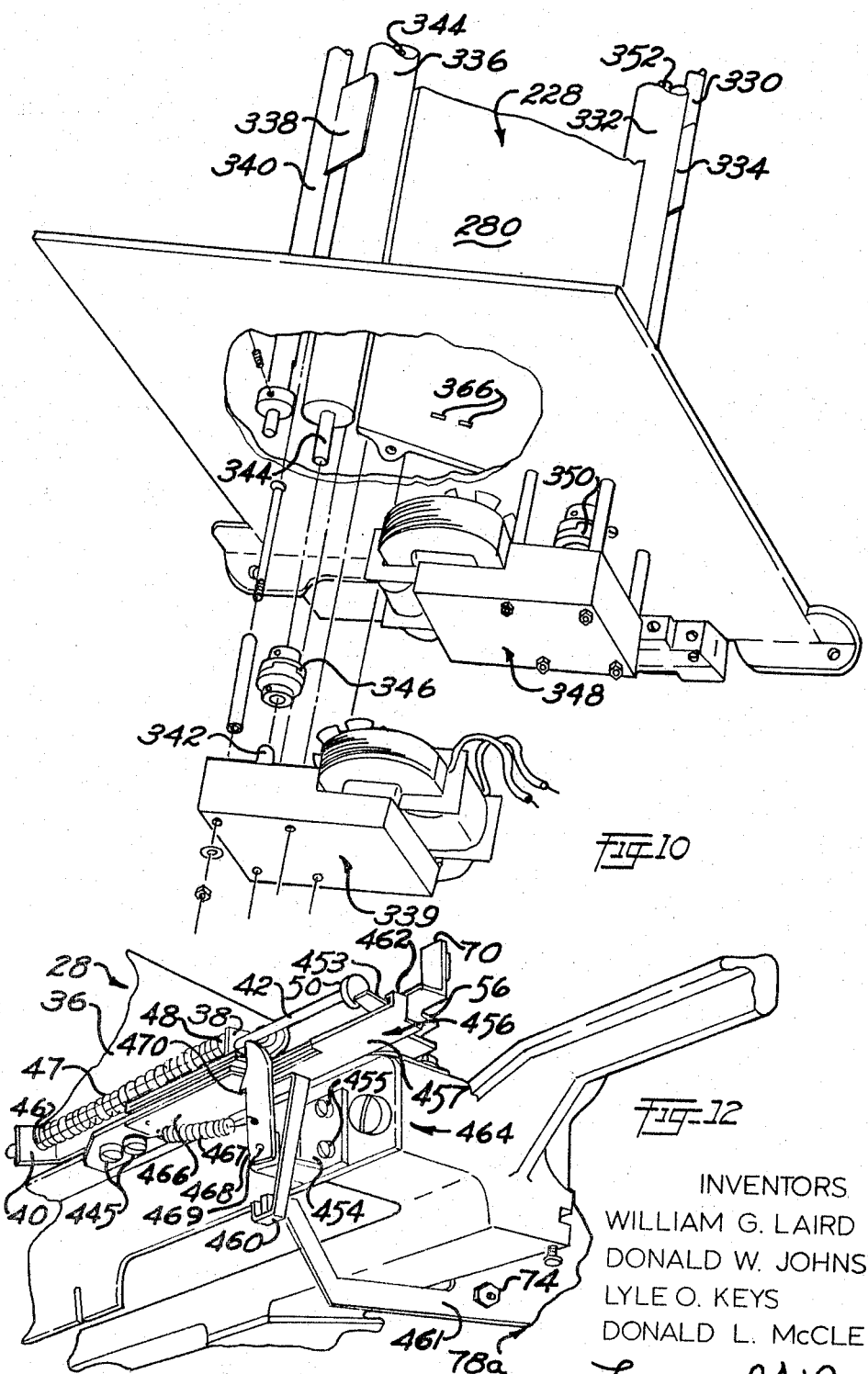

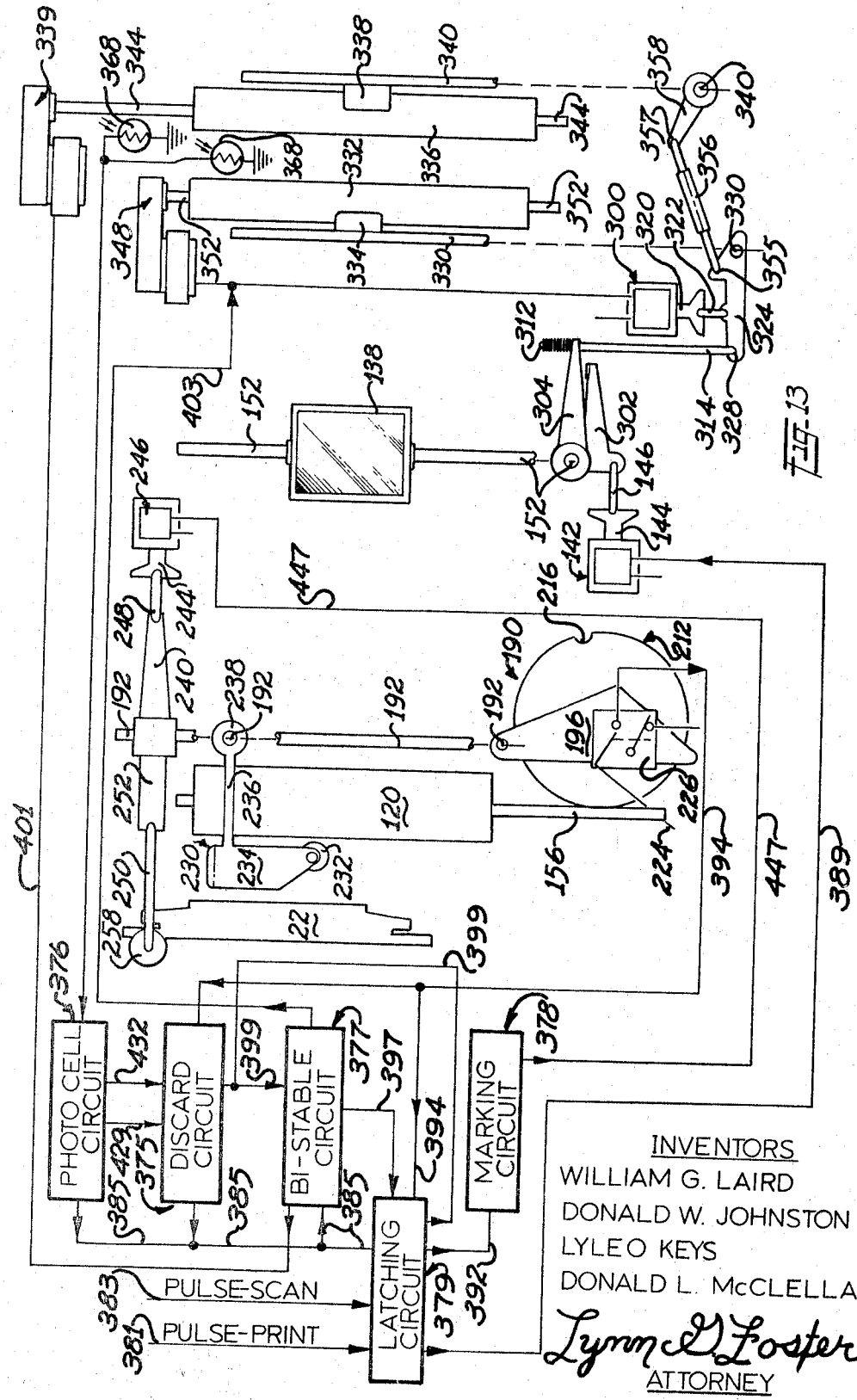

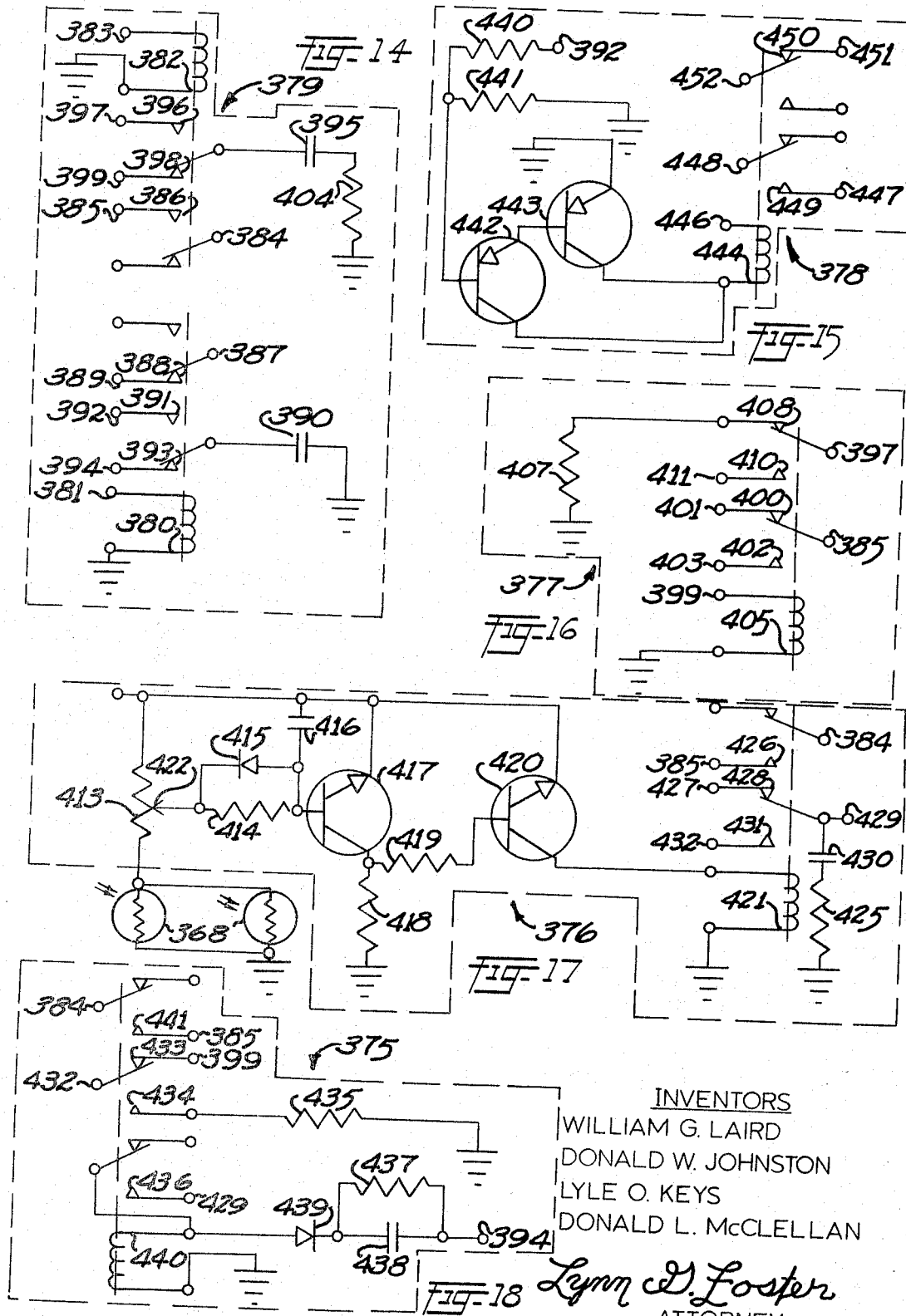

United States Patent Office 3,320,363
Patented May 16, 1967

3,320,363
SYSTEM FOR PRINTING AND TELEVISING
William G. Laird, Donald W. Johnston, Lyle O. Keys, and Donald L. McClellan, all of Salt Lake City, Utah, assignors to Telemation, Inc.
Filed Feb. 21, 1966, Ser. No. 529,142
29 Claims. (Cl. 178—25)

The present invention relates generally to a system for printing facsimile and televising the printed facsimile, and more particularly, in the presently preferred embodiment, to a system using a novel apparatus and a unique method, whereby lines of telegraphic signals are received, and reduced to a plurality of short lines of printed characters disposed upon a continuous sheet, following which the full lengths of the printed short lines are televised upon a screen as clearly discernible and easily read character. Among other things, this invention comprehends direct televising of information as it is printed and also delayed televising of such printed information, one or more times, after it is ejected from the printer.

Prior proposals to televise information printed upon a sheet or web by a telegraph printer have possessed certain objectionable characteristics. Some such proposals have been cumbersome to use, easily maladjusted, and/or comprising complex and expensive equipment.

Surmounting all other deficiencies has been the lack of television viewer appeal. More specifically, existing television pickup, distribution and recovery equipment in conjunction with the allotted United States standard television channel band width jointly impose certain limitations as to the degree of picture definition which can be reproduced through a television system. Thus, the process of televising printed material of fixed physical dimensions, such as a conventional line or lines of characters printed by a telegraph printer using standard techniques, has inherently reproduced printed characters upon the television screen which cannot be easily discerned and comfortably read by a person observing the screen. Hence, in practice, the print displayed upon the screen has poor viewer appeal and can create annoying eye fatigue because alternatively: (a) the print is too small to be clearly perceived, as when spaced lines of standard length are displayed in their entirety, or (b) the print comprises only one continuous line of print, including only a few words, disposed upon a narrow tape, which not only may exhibit a jerky motion across the screen but requires the constant attention of the viewer and necessarily uses only a small portion of the screen, as when the so-called ticker tapes are televised or (c) a distracting apparent side-to-side movement is generated which disrupts message continuity, as when spaced lines of standard length are televised in segments panning progressively from the left side to the right side at a relatively close distance to increase the character size displayed upon the sceen.

Moreover, no known prior art apparatus or method of the type under consideration accommodates both direct televising of information as it is printed by a telegraph page printer and delayed televising of the same information, one or more time, after it is ejected from the printer.

Though in no way anticipatory of the present invention, the most related known prior art patents are United States Patents 1,969,440, 2,551,797, 2,611,027 and 3,187,094.

In view of the foregoing, the present invention constitutes a valuable contribution to the art of televising facsimile information. This invention provides a novel method of and a unique apparatus for displaying telegraphically-received printed lines of information upon a television screen in a manner deriving the following features: (a) the print appears upon the screen as relatively large, easily discerned characters; (b) avoidance of apparent side-to-side movement of the characters upon the screen, only a vertical movement of each entire printed line being perceptible; (c) both direct and delayed televising of the same printed information, i.e. first at the printer as the information is printed (with the screen image novelly appearing substantially stationary during printing of any line in spite of the shifting movement of the printer between upper case and lower case print positions) and later at a second location downstream from where the sheet is ejected from the printer.

Accordingly, a primary object of this invention is the provision of a novel apparatus for and a unique method of printing facsimile and televising the printed facsimile so that the characters thereof can be easily and comfortably read upon a television screen.

It is also a primary object of this invention to display large, readily distinguished characters comprising printed facsimile upon a television screen by printing a plurality of short lines in response to receipt of each standard line of telegraphic signals and by televising the full length of the short lines of facsimile to avoid creation of apparent side-to-side movement of the characters upon the screen.

Another important object of this invention is the novel provision for directly televising printed facsimile as it is printed while compensating for shifting of the printer platen between upper and lower case print positions, during the printing of any line of information, so as to substantially immobilize the televised image displayed.

Another significant object of this invention is the unique provision for delayed televising of the printed facsimile, one or more times, after the same is ejected from the printer.

Another significant object of the present invention is the provision for selectively bringing a television camera into registry with printed information disposed upon an essentially continuous sheet either directly as the information is printed or later after the information has left the printer, and, if desired, to alternatively focus the camera upon a still picture, such as a post card or film slide containing advertising or identification information.

Another and no less improtant object of this invention is the provision of "story" identification system for placing indicia upon the sheet between minimum quantities of printed information disposed upon a sheet and the provision for sensing the indicia to assure continuous televising of enough information at any one interval of time to elicit high viewer interest and to selectively reverse sheet displacement to repeat the cycle or discard a length of the sheet as more stories are printed.

These and other objects and features of the present invention will become more fully apparent from the following description and appended claims taken in conjunction with the accompanying drawings wherein:

FIGURE 1 is a perspective of a presently preferred embodiment of the present invention;

FIGURES 2–4, inclusive, are fragmentary perspectives of mechanisms which accommodate printing of a plurality of "short" lines of characters for each conventional line of telegraphic signals received;

FIGURE 5 is a fragmentary perspective of a device for optically immobilizing the image appearing on a television screen when a printer is used which inherently shifts between upper case and lower case print positions;

FIGURE 6 is a fragmentary perspective of the sheet-metering apparatus and the indicia marking apparatus of the mentioned presently preferred embodiment;

FIGURE 7 is a fragmentary perspective particularly illustrating the marking and metering reset solenoid and actuator linkage;

FIGURE 8 is a schematic side elevation illustrating the sheet travel path, the three possible paths traversed by the optical path of a single television camera including the positions of optical mirrors, and the relative locations of the three stations upon which the television camera may be selectively focused;

FIGURE 9 depicts, in perspective, apparatus for positioning the scan mirror;

FIGURE 10 is a perspective which illustrates the drive system for displacing the sheet across the scanning station in first a forward and then in a reverse direction;

FIGURE 11 illustrates the indicia sensing apparatus of the presently preferred embodiment;

FIGURE 12 is a perspective depicting a mechanism for restricting the number of "short" lines printed per line of signals received to two;

FIGURE 13 is a schematic representation of various components of the overall apparatus shown in combination with an electrical block diagram; and FIGURES 14-18, inclusive, are electrical schematics of the presently preferred logic circuitry.

PRINT MODE

Figure 1:
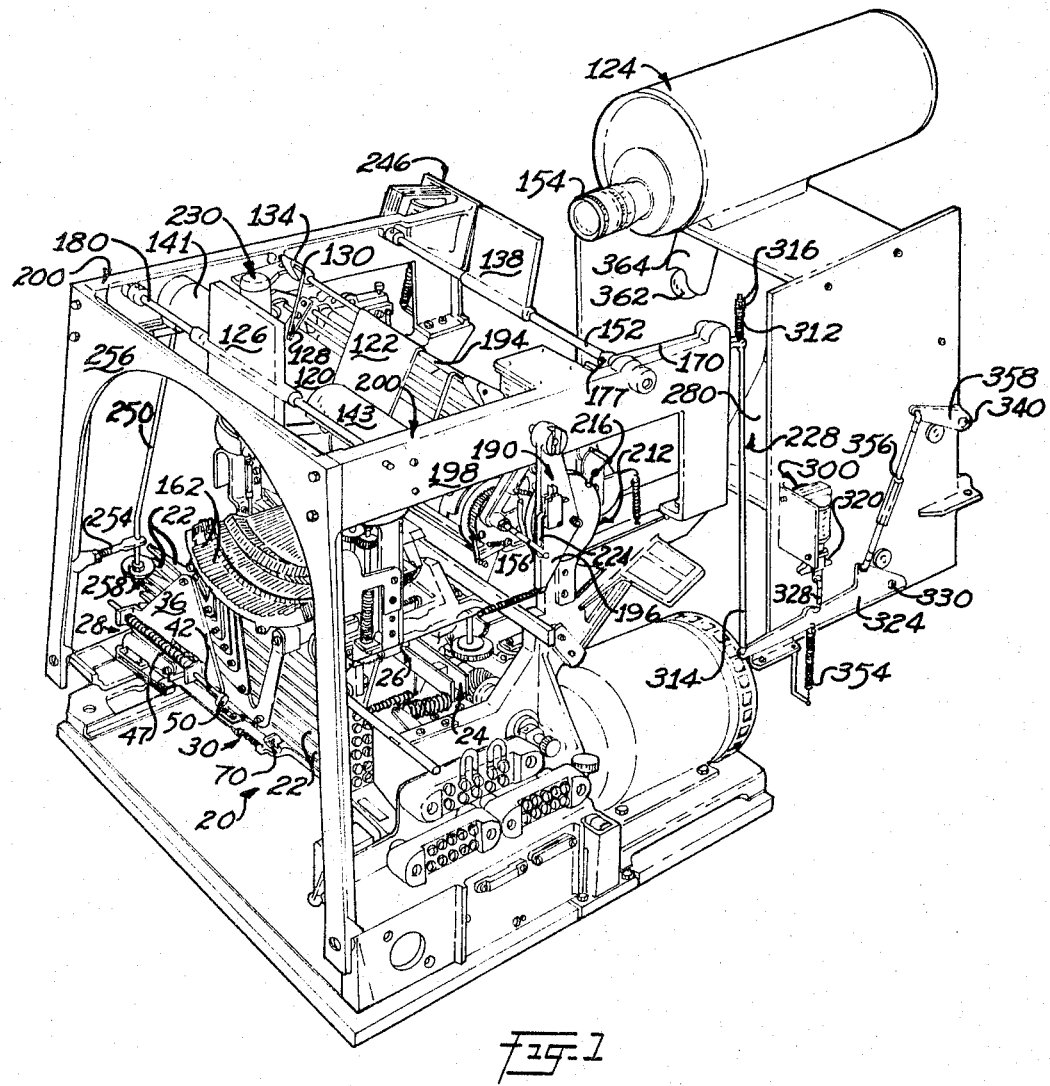

*The Printer.*—Referring now to the drawings in detail, FIGURE 1 depicts in perspective the entire apparatus (with the cover and support frame removed) of a presently preferred embodiment of this invention. Part of the apparatus comprises a telegraph page type printer mechanism, generally designated 20, which in this instance, for the most part, is a Model 15, manufactured by Teletype Corp., although other printers could be used. Printer 20 is an electro-mechanical device which conventionally produces printed messages disposed as lines upon a sheet or web corresponding to electrical signals or impulses received from a remotely located keyboard sending unit or other signal-generating equipment. Normally, these impulses comprise a series of five-bit code groups and intermittently drive the coil of a selector magnet connected across a telegraph line linking the keyboard sending unit to the printer. Of course, a local keyboard sending unit can be electrically connected to printer 20 to accommodate printing and televising of local news and the like.

Even though printer 20 is conventional for the most part, in structure and operation (except for line feed and carriage return functions as hereinafter more fully explained), a brief description of the general operation of the printer will be helpful.

The armature of the printer selector magnet is synchronized with the rotary motion of a cam sleeve, which is clutch coupled to the main drive shaft of the printer. As the clutch is engaged, the cam sleeve, operating in conjunction with the magnet armature, selectively positions a combination of five levers, which in turn are coupled to and control the angular positioning of the top five of the six metal vanes 22 (FIGURE 1). The sixth vane (the lowest vane) shown in FIGURE 1 is not used in conjunction with the five-bit code selection being described and, thus, this specification contains no further description of the sixth vane. The mentioned positioning of the five vanes 22 preselects the various individual printing operations to be carried out with the succeding stroke of motor-driven master bail 24, as the printer type bar carriage 26 is displaced left to right. For a comprehensive description of the structure and operation of the Model 15 printer, see "Description Type Bar Page Printer Model 15, Bulletin No. 144 issued September 1944," Teletype Corp., Chicago, Illinois.

Printing operations which do not directly pertain to the actual typing of characters are called functions. Thus, line feed, carriage return, letter case shift, tabulation etc. are functions. Two of these functions, i.e. line feed and carriage return, according to the present invention are distinctive and novel when compared with standard printing operations.

*Short line printing.*—Each transmitted line of telegraph signals (a full line on the average, using the Model 15 Printer, is on the order of 74 character spaces) is received and novelly printed by telegraph page printer 20 as two or more "short" lines. In the illustrated embodiment, which is not to be considered restrictive, approximately the first one-half of the line of signals is printed as a "short" line of facsimile information (of about 34 character spaces using the mentioned printer). The second half of the mentioned transmitted line of signals is printed immediately below the first printed line of facsimile. Preferably, printing, as described, is restricted to two "short" lines per transmitted line of signals. One mechanism for suitably restricting printing to two "short" lines and no more for each transmitted conventional line of telegraph signal is described below under the topic "Third Line Eliminator."

Nevertheless, with some embodiments of this invention, occasionally a third printed line of very short length may result where the line of transmitted signals is unusually long. Such format alteration, accommodates the display of larger characters on a television screen facilitating easy viewer reading, as more particularly explained hereinafter.

To more particularly describe the mentioned "short" line printing technique, reference is made not only to FIGURE 1, but also to FIGURES 2, 3 and 4. The novel "short" line printing is accommodated by distinctive line feed and carriage return functions using, in the illustrated embodiment, (a) a trigger actuator assembly, generally designated 28, carried by type bar carriage 26, (b) a trigger assembly, generally designated 30, mounted to the frame of printer 20, and (c) a carriage return/line feed function bail assembly, generally designated 32.

Line feed and carriage return functions conventionally occur as a result of two separate five-bit code groups causing type bar carriage 26 (FIGURE 1) to return to the left hand margin upon receiving one particular code group and advance the page, generally vertically in the direction of its length, in preparation for printing the next line when a second code group is received.

In contradistinction to the foregoing, the presently preferred embodiment of this invention provides a new method and unique apparatus, comprising the mentioned assemblies 28, 30, and 32, by which simultaneous carriage return/line feed functions may be executed with a single stroke of master bail 24 upon receipt of an intermediate space code group, received after the type bar carriage has traversed a predetermined number of character spaces along a given line. For example, the simultaneous execution of line feed and carriage return may be effectuated after approximately 34 character spaces from the left hand margin have been traversed by type bar carriage 26.

Structurally, trigger actuator assembly 28, best shown in FIGURE 2, is mounted on the type bar carriage 26, by screws 34, and serves, among other things, to replace the standard bellcrank retainer (not shown) of printer 20. The trigger actuator assembly is preferably fabricated of plate metal and comprises a triangular portion 36 from which a pair of apertured fingers 38 and 40 integrally project in substantially perpendicular relation. An actuator rod 42 loosely extends through the apertures 44 and 46 disposed, respectively, in the fingers 38 and 40.

Compression spring 47, which exerts pressure between finger 40 and collar 48, urges the rod 42 to the right a maximum distance permitted by the position of collar 48. The collar is preferably nonrotatably secured to rod 42 by a set screw or the like so that it can be selectively and securely placed at different locations along the rod. This will determine the point in time at which the rod end 50 will contact a stop 70 and thus will control the average length of each printed line.

Structurally, the trigger assembly 30, best shown in FIGURES 2 and 4, is comprised of a stationary mounting plate 57 to which slider bracket 56 is fastened by screws 52 and 54. Lateral motion of slider bracket 56 is accommodated by a pair of slots 58 and 60 disposed in a horizontally disposed planar portion 61 of the slider bracket. Extension spring 62, of lesser strength than the previously mentioned spring 47, is joined to the assembly mounting plate 57 at 64 and to the slider bracket at 66. Thus, extension spring 62 operates in tension to normally bias slider bracket 56 toward the left the maximum distance permitted by the length of slots 58 and 60. The slider bracket 56 further comprises an upwardly extending projection or stop 70 adapted to be engaged by the rod end 50 in a manner and for purposes later to be more fully described. Moreover, the slider bracket 56 includes a rearward extension 72 (FIGURE 4), which normally blocks forward rotation of bail assembly 32 and, upon being displaced by rod end 50 accommodates rotation of bail assembly 32 as later more particularly described in this specification.

The bail assembly 32 comprises a plurality of members as best seen in FIGURES 3 and 4, i.e. function levers 78 and 80 and rear extension brackets 90 and 92. The bail assembly 32 is essentially conventionally mounted for limited pivotal movement upon the printer at recesses 79 and 81 (FIGURE 4) disposed in bracket 92 and function lever 80, respectively, with function lever 78 pivotally jointed to bracket 92 by nut and bolt assembly 74. Nut and bolt assemblies 83 non-rotatably join arm 93 of function lever 80 to corresponding arms of extension brackets 90 and 92 for integral movement. The function lever 78 is biased by spring 77 and function lever 80 by spring 76 each toward the forward part of the printer. The force exerted by extension spring 76 applies an upward or counterclockwise (as viewed in FIGURES 3 and 4) pressure on rear extension brackets 90 and 92. The forward motion of upward extension 86 of function lever 80, and thus, the rotational movement of bail assembly 32 (around an axis coincident with recesses 79 and 81), is normally restrained by the previously mentioned rearward extension 72 of the slider bracket 56 and/or vanes 22.

Function lever 78 comprises a notched upward extension 82 and a rear extension 84, as is conventional for the most part. The function lever 80 comprises notched upward extension 86, being novelly encoded to cooperate with vanes 22 upon receipt of a transmitted space code signal. Rear extension bracket 90 is the line feed bracket and rear extension bracket 92 is the carriage return bracket. The bail assembly 32 in conjunction with the trigger assembly 30, particularly through the operation of the notched upward extension 86, which is a code sensing portion, accommodates simultaneous line feed/carriage return functions at least once between the beginning and the end of a conventional line of telegraphic signals as the signals are transmitted in the usual way.

In the presently preferred mode of operation, as type bar carriage 26 along with trigger actuating assembly 28, which is carried by carriage 26, is advanced left to right, as a line of characters is being printed (responsive to serially receiving a line of telegraphic signal information), the end 50 of the rod 42 engages the aligned surface of the stop 70, as shown in phantom lines in FIGURE 2, after approximately for example 34 character spaces have been traversed by the type bar carriage 26. If a space code signal is not immediately received, the carriage 26 continues to be displaced toward the right. Spring 47, having a greater spring force than the extension spring 62, accommodates limited displacement toward the right of the slider bracket 56 a distance permitted by the bracket slots 58 and 60. Once the slider plate 56 is so displaced, the rear extension 72 thereof is positioned out of engagement with function lever 80 and the bail assembly 32 is no longer restrained by extension 72.

Thereafter, until a space code signal is received, type bar carriage 26, with plate 36, continues to be displaced along the line as printer 20 continues to accommodate printing of characters. As this continued advance is achieved, rod 42 will be held stationary by engagement with stop 70 as triangular bracket 36 moves to the right. Hence, spring 47 is further compressed as illustrated in phantom lines in FIGURE 2.

Each successive stroke with the master printer bail 24 will allow one or more of the notches along the forward edge of the notched upward extension 86 to rest against the adjacent vane 22 which then prohibits further forward rotation of the bail assembly 32. When a space code group is received, the vanes 22 are all properly aligned and unitarily complete forward rotation of brackets 90 and 92 and function lever 80, all of bail assembly 32, is accomplished by force of the spring 76. Extensions 92 and 90 in turn respectively lift and release the carriage return latch bar 94 disengaging the carriage advance clutch (not shown) and raise the line feed push bar 96 (FIGURE 3). The function bail extension (not shown) of the printer 20 contacts push bar 96 enabling execution of simultaneous carriage return and line feed functions in a single stroke of the printer master bail assembly 24. Engagement of the carriage advance clutch (not shown) is restored by conventional means as the type bar carriage 26 is returned to the left hand margin. The related operation of trigger actuator assembly 28 and trigger assembly 30 along with bail assembly 32 is unique in that allowance is made for "over travel" of the printer carriage in anticipation of receipt of a space code group by the printer. When a space code group is received, simultaneous carriage return/line feed functions are executed to accommodate printing of a plurality of printed "short" lines upon the sheet for each conventional or standard line of telegraphic signals received by the printer.

Conventional execution of carriage return and line feed functions results following receiving of an entire standard line of telegraphic signals by the printer, usually at the end of each even numbered "short" line.

A function lever bail roller (not shown) riding at inside surface 98 (FIGURE 3) of rear arm 100 of code sensor lever extension 86 restores the bail assembly 32 to its original position with the return stroke of the master bail 24, being retained as before by rear extension 72 of slider bracket 56. Restoration of all function levers, associated with the printer 20, is accomplished by the function lever bail roller in a similar manner.

Function lever 78, in conjunction with extension spring 77, through independent rotation causes rear extension 84 to lift carriage return latch bar 94 accommodating conventional execution of the carriage return function once a standard line, of approximately 74 telegraphic signal characters, has been received by the printer. Normal operation of the line feed function is likewise accommodated by a lifting motion of the rear extension 102 (FIGURE 3), which is part of the convention line feed function bar (not fully shown) of the printer.

Preferably, the standard right and left hand margin limit adjustment screws (not shown) of the printer are replaced by a similar type having greater length and the replacement screws are adjusted, in order to properly center the printed material on the sheet. A slight readjustment of the tension of the carriage return spring (not shown) and the dashpot escapement valve (not shown) are desirable to insure that the type bar carriage 26 is fully returned to the left hand margin position within the time provided without causing undue shock damage to the mechanism of the printer or insufficient spacing between the first two characters of a line.

*Third line eliminator.*—The simultaneous carriage return/line feed function described above without structural modification may only occur upon receipt of a conventional space code group. Although the length of a conventional line of telegraph signals will average approximately 74 character spaces, the number of character spaces in each line of signals will vary considerably. It is therefore not likely that each standard line of signals will be disposed upon the sheet as exactly two short lines of printing. Consequently, one of two effects will occur, being dependent upon the adjustment of collar 48 along the length of rod 42. Either an occasional third line of very short length will be printed or a somewhat longer short line will consistently be serially interposed between somewhat shorter short lines.

To resolve this problem the mechanism depicted in FIGURE 12 may, if desired, be installed to insure that each conventionally transmitted line of signals is always printed as only two lines, which are generally of the same order of magnitude in length.

Referring now in detail to FIGURE 12, the slider bracket 56 is substantially unchanged with the exception that it is maintained biased to the left (as viewed in FIGURE 12) by both spring 467 and latch arm 468 as opposed to the previously described use of spring 62 alone. Function lever 78a is similar to function lever 78, previously described, being rotatably mounted by bolt-nut assembly 74 as part of bail assembly 32 (FIGURES 3 and 4). Function lever 78a, however, further comprises a forward extension 461. Actuator assembly 28 is as previously described (see FIGURES 3 and 4).

Spring lock 456 comprises a double leaf spring, the leaves thereof being suitably joined together, for example by resistance welding near the mounting point of screws 445. Leaf 466, being the lower leaf, further comprises a downward hook extension 460 with the free end of the upper leaf 457 having an upward-extending stop hook 462. Latch 464 comprises mounting bracket 454 secured to the printer frame by screws 455. The latch arm 468 extends upward from bracket 454, being rotatively fastened to the bracket at point 469. Extension spring 467 exerts a force on latch arm 468 which is in turn imparted to slider bracket 56.

As a code group is received by the printer to initiate a conventional carriage return function, function lever 78a is rotated around an axis coincident with the center of bolt-nut assembly 74. This action, along with the related operations previously described in conjunction with function lever 78, causes outermost end of forward extension 461 to move downward (counter-clockwise as viewed in FIGURE 12). This downward motion is transferred to the lower leaf 466 of spring lock assembly 456 through its lower extension 460 which is hooked around the end of extension 461.

When rod end 50 of rod 42 is in contact with upward stop 70 of slider bracket 56 at or near the completion of printing an even numbered short line, the free end of the upper leaf 457 will be restrained from downward movement with its upward extension 462 being hooked over the forward extension 453 slider bracket 56. Leaf 466 then will be displaced by the mentioned downward motion of extension 461 from its parallel position relative to upper leaf 457, its free end being thereafter latched in a downward position by barb 470 of latch arm 468. This in turn will bias upper leaf 457, also in a downward direction, so that when the actuator assembly 28 is returned to the left margin with the type bar carriage, the upward extension hook 462, flexing near its mounting, will be pulled down to a position below forward extension 453. When the printer carriage is again advanced toward the right a predetermined number of character spaces along an odd numbered short line, slider assembly 56 is actuated by engagement of rod end 50 with stop 70 in preparation for a simultaneous carriage return and line feed function. When rod end 50 contacts upward stop 70 to initiate this simulated function, spring pressure is imparted by compression spring 47, through rod 42, moving slider bracket 56 to the right a distance permitted by slots 58 and 60 (FIGURES 2 and 4). This will release leaf 466 from its latched relation at barb 470, the force of spring 47 being greater than that of spring 467, thus removing the downward bias from upper leaf 457. The slider bracket 56 has by now, however, moved sufficiently to the right so that the top of hook 462 rests against the bottom of forward extension 453 of slider bracket 56. Leaf 457 remains in this position until a space code is received which returns the printer carrige to the left margin. As this occurs hook 462 flips upward to subsequently prohibit a second simultaneous carriage return/line feed function. Therefore, the next carriage return will necessarily be conventional. By this technique only one and never two simultaneous carriage return/line feed functions may occur following a conventional carriage return function. Hence, each standard line of telegraph signals will be printed without exception as two short lines of characters.

It is to be appreciated that two consecutive conventional carriage return functions may occur, the spring lock mechanism merely being depressed twice in succession without a release.

*Optical immobilization.*—As previously set forth, the telegraph page printer 20 receives and prints news copy or other information, such as weather and sports, on a continuous sheet of broad-width paper (see FIGURE 8). The paper is advanced to receive each new line of print in the direction of its length around a conventional printer platen 120 and upward across paper guide plate 122 where information may be televised as it is printed by use of television camera 124 and print mirror 126 (FIGURES 1 and 8), as will be better understood as the description proceeds. The downward depending distal end 128 of each paper guide rod 130 and 132 serve to hold the continuous sheet of paper or other suitable material in essentially flat relation paralleling the plane of paper guide plate 122. The angular positions of each of the two adjustment eccentrics 134 and 136 can be varied (by means of friction-fit mounting or the like) to adjust the degree of force exerted by the paper guide rods 130 and 132 against the sheet of paper.

During the print mode of operation, the full length of adjacent "short" lines of printed facsimile may be televised in their entirety as the printer mechanism is operated. This eliminates any apparent side-to-side character displacement and loss of subject continuity, otherwise necessitated by horizontally panning the camera and at the same time displays relatively large characters upon a cathode ray television screen for easy reading. During such televising the scan mirror 138 is disposed in its inoperative position, identified as 140 in FIGURE 8. Hence, the optical path of the television camera 124 is without interference, the camera being focused upon the portion of the sheet overlaying paper guide plate 122, through reflection from print mirror 126. The paper adjacent plate 122 is suitably illuminated by sources of light disposed beneath and reflected from reflector shields 141 and 143 (see FIGURES 1 and 7). Since reflections from print mirror 126 (and scan mirror 138) transpose the image, the attachments of the two wires of the horizontal deflection coil of camera 124 are reversed. Hence, a reverse horizontal deflection results.

Positioning of the mirror 138 into the position 140 (FIGURE 8) is accomplished, in this embodiment, by energizing the coil of solenoid 142 (FIGURES 7 and 9) which causes plunger 144 to be pulled inside the field magnet which in turn exerts a rightward linear force (as viewed in FIGURE 9) through link 146 upon crank lever 148. Such linear force overcomes the force of extension spring 150 accommodating counterclockwise rotation of crank lever 148 (as viewed in FIGURE 9). The crank lever 148 is suitably non-rotatably secured to scan mirror shaft 152, as is scan mirror 138. Thus, the mentioned counter-clockwise rotation of crank lever 148 correspondingly rotates the scan mirror 138 into position 140 (FIGURE 8).

With the scan mirror 138 positioned out of view of the camera 124, picture images are now reflected off the paper disposed in the vicinity of the plate 122 onto the surface of the print mirror 126 into television lens 154 and are focused upon the faceplate area of the pick-up tube of camera 124.

Using the printer illustrated and described, a slight vertical displacement of the sheet is intermittently created, as the sheet passes parallel to the flat surface area of plate 122 (FIGURE 8), due to the shifting of printer platen 120 and the printer platen shaft 156 between upper case and lower case print positions. The mentioned shifting takes place between extreme limits represented by center lines 158 and 160 (FIGURE 8) as the platen is rotated arcuately about the center axis of the platen cantilever support structure 161 (FIGURE 5). This motion is conventional, being inherently necessitated by the operation of the printer mechanism as it repositions the platen relative to type bars 162 (FIGURE 1) selecting between the typing of upper case and lower case characters.

If such platen shifting motion is directly televised, the resultant shifting of picture information is very annoying to the viewer because of the inherent image retention characteristics of vidicon tube and like pick-up devices and the distraction and eye fatigue which would result by reason of the viewer having to constantly refocus his vision. The present invention overcomes this problem by utilization of a suitable system to optically immobilize the platen shifting movement.

In the illustrated embodiment, as best seen in FIGURE 5, an upwardly extending mounting lever 170 is integrally mounted on platen pivot support structure 161, such as by screws, and is also linked to print mirror shift lever 172 by tie rod link 174. Tie rod link 174 is made up of ball socket ends 176 and 178 along with the central rod, which is appropriately connected, as for example by threads to the two ends 176 and 178. The print position shifting motion of the platen assembly is thus imparted to lever 170 causing a corresponding linear movement of the tie rod 174. This results in the pivoting of arm 172, which is non-rotatably joined to print mirror shaft 180, around an axis coincident with the center line of mirror shaft 180. Print mirror 126, being non-rotatably fastened to shaft 180, is simultaneously angularly repositioned as the platen is shifted in such a manner and to an extent sufficient to achieve the desired optical correction required to substantially immobilize the television image (contrast the solid and phantom positions depicted in FIGURE 5). Thus, the only appreciable movement perceptible to the viewer will be vertical line feed motion occurring is the printer platen is advanced with the printing of each successive line.

Of course, it is to be understood that not all telegraph printers create a shifting motion between upper case and lower case print positions. If such a printer were used in conjunction with the present invention, optical immobilization of the type described would not be necessary.

SCAN MODE

*Sheet metering system.*—The present invention includes provision of suitable means to divide the printed copy produced by the page printer 20 into segments or "stories" having a predetermined minimum and controlled maximum quantity of printed material as measured along the length of the paper or like stock upon which the lines of facsimile are transversely placed before the paper is deposited in a storage station or loop 182 (FIGURE 8). The presently preferred embodiment of this invention comprises use of a device which is friction coupled to the platen shaft 156 for mechanically measuring the paper or metering the cumulative rotation of the platen, and for placing a light-obstructing mark on the paper to identify the beginning and the end of each "story." The mentioned marks are used to control the movement of the paper during the "scan mode" operation as will be explained later in greater detail.

For the purpose of describing the mentioned metering and marking of the paper, reference is now made in particular to FIGURES 1, 6 and 7. A metering assembly, generally designated 190, is substantially non-rotatably secured on shaft 192, which shaft rotatably passes through the hollow center of a paper guide sleeve 194, from which sleeve the paper guide plate 122 depends. Metering assembly 190 is supported by shank 196 (FIGURE 6), the shank transmitting the weight load it supports to a beam 198 which forms part of the overall mirror or optical support frame 200. The metering assembly 190 is held in position adjacent mirror support member 198 by means of roll pin 202 (FIGURE 6), which pin is disposed in a slightly oversize slot 204 so as to pass through an aperture (not shown) disposed in shaft 192 near the end thereof. The oversized characteristic of slot 204 accommodates a small amount of rotational movement arcuately about the center line of shaft 192. Such limited arcuate motion is independent of the exact angular position of pin 202 with respect to the shaft 192. The metering assembly 190 is normally spring-biased, by extension spring 206 which fastens between frame 200 at 208 and shank 196 at 210, into its maximum clockwise position (as viewed in FIGURE 6), permitted by the engagement of tire 210 of metering wheel 212 with shaft 156.

As a "story" is about to be printed, rubber tire 210 of metering wheel 212 will be contiguously engaging the printer platen shaft 156 by force of spring 206. The metering assembly 190 will be generally disposed in the position shown in FIGURE 6 with metering wheel 212 rotatably mounted upon the short shaft 214 adjacent the inside surface of shank 196. Notch 216 is shown at "zero-length" or starting position in FIGURE 6, which position is determined by the point of angular rotation at which stop pin 218, protruding inwardly beyond the inside surface of shank 196, collides with a similar stop pin (not shown), protruding outwardly from the side of metering wheel 212.

Metering wheel 212 is returned to the illustrated starting position, in a cyclic manner, each time the wheel is reset by force of spiral spring 220. Spring 220 is suitably secured at one end to short shaft 214, with the opposite end being fixed in position by a screw 224 threaded into shank 196. Thus, a clockwise force is exerted upon wheel 212 by spring 220 as the wheel rotates counter-clockwise during printing. Consequently, the advance of the paper by the printer platen 120 rotates shaft 156 clockwise and accordingly, causes metering wheel 212 to follow in a counter-clockwise direction at a reduced angular velocity determined by the respective diameters of shaft 156 and wheel 212.

Notch 216 is eventually "dropped over" shaft 156 when the two are brought into alignment and the force of spring 206 rotates shank 196 clockwise a short distance. This allows tang 224 of switch 226 to be contacted and displaced by shaft 156 thereby closing the contacts of switch 226 and leaving notch 216 slightly spaced from the platen shaft 156. Actuation of switch 226 indicates to the logic circuit that a sufficient length of paper has been measured and accumulated in storage loop 182 (FIGURE 8) adequate to accommodate "delayed" televising of a "story" at scanning station 228 (FIGURE 8) when the printer 20 is inoperative.

After notch 216 (FIGURE 6) becomes aligned with shaft 156 and switch 226 is closed, the printer 20 continues to operate as before until a predetermined combination of code signals are received in the conventional way indicating completion of the segment of news or "story" being printed. Sensing of such combinations of coded signal groups, for the purpose of selecting between the "scan" and "print" modes, (beginning and end of story) may be accomplished by use of electronic selecting equipment such as the Model 1301–AP/1 manufactured by Frederick Electronics Corp., Frederick, Maryland.

*Indicia marking system.*—During printing, ink dispenser 230 is held in substantially the position illustrated in FIGURE 6 with the inking wheel 232, which is in fluid communication with the ink containing reservoir tank 234, spaced a short distance away from the sheet. The ink tank 232 is rsiliently supported by leaf spring 236, which is an extension of collar 238. The collar 238 is non-rotatably secured to shaft 192. Thus, ink tank 234 and inking wheel 232 are premitted a small amount of rotational freedom through the flexing of spring 236.

As mentioned, shaft 192 passes freely through the hollow center of paper guide sleeve 194 and is non-rotatively secured to a lever 240 (FIGURE 7). Extension spring 242 normally holds lever 240 in its rest position, which is determined by the outermost excursion of plunger 244 of marking solenoid 246. Plunger 244 is linked to end 248 of lever 240. Linkage rod 250 extends downward and forward from its rotatable connection at end 252 of lever 240 and is restricted from pendular motion, near its lower extremity, by reason of passing through an aperture in eyebolt 254. Eyebolt 254 is stud-mounted to yoke 256 of mirror frame 200. Nut-secured washer 258 fits freely between the first and the second printer vanes 22 (counting from the top), as shown in FIGURE 1. Thus, the mentioned second vane is mechanically depressed when solenoid 246 is actuated.

Once notch 216 is disposed adjacent shaft 156 to closed switch 226 and a code signal is received indicating the end of a news or like segment of information, as previously explained, solenoid 246 (FIGURE 7) is actuated for a short period of time, (e.g. 1.5 seconds) to retract plunger 244 within the coil of the solenoid. This rotates lever 240 about the center line of shaft 192 in a clockwise direction (as viewed in FIGURE 7) causing rod 250 to be displaced downward. This results in depression of the forward edge of the mentioned second vane 22 of the printer 20 to stimulate mechanical line feed functioning.

At the same time, the mentioned clockwise rotation of lever 240, responsive to actuation of solenoid 246, correspondingly rotates shaft 192 within sleeve 194. Such rotation of shaft 192 causes a slight counter-clockwise rotational (as viewed in FIGURE 6) of ink dispenser 230 and of the metering wheel shank 196. This rotation brings inking wheel 232 into contact with the paper and at the same time permits metering wheel 212 to return to its original starting position by force of spiral spring 220, as previously mentioned. Electrical contact between the signal line and the printer selector magnet (not shown) is momentarily interrupted to prevent interference of the line feed function being stimulated by depression of the mentioned second vane 22. A series of line feed functions are then executed in rapid succession by the printer while inking wheel 232 remains in contact with the paper causing ink stored within tank 234 to be transferred to the paper in the form of a narrow stripe along one side margin. These side ink stripes are useful in "delayed" televising of the printed information at the scanning station 228 (FIGURE 8), in a manner subsequently to be more fully described.

*Sheet travel path and television optical paths.*—With reference to FIGURE 8, the sheet follows a travel path beginning at a folded stack or, alternatively, a roll supply source 270 of sheet paper or the like. The continuous sheet is periodically displaced, by action of printer platen line feed, along path segment 272 serially around paper guide shaft 274 and platen 120 and in planar relation across the flat guide plate 122. Here, a news or like "story" can be televised as it is printed with the full length of the printed "short" lines being displayed as large characters upon the television screen and the shifting of the printer platen between upper case and lower case print positions being substantially eliminated in the displayed image, as explained. The television optical path, with scan mirror 138 positioned at position 140, traverses between the planar sheet at the printing station adjacent plate 122 and camera lens 154, as reflected by print mirror 126.

With continued reference to FIGURE 8, the print-carrying copy sheet is ejected from the printing station around guide sleeve 194, along path segment 276 and is deposited at storage station 182, at least partly by force of gravity. Of course, suitable guides (not shown) can be provided to assure proper deposition of the printed sheet at storage station 182. As previously mentioned, a sufficient length of copy sheet is accumulated at storage station 182, from which the sheet is routed along path segment 278 and in a forward or generally upward direction in planar relation across scanning plate 280 at scanning station 228. Thus, normally when the printer 20 is inactive, the sheet stored at the storage station 182 is displaced, by a drive system yet to be explained, across the plate 280 where a "story" is televised using the same camera 124, without repositioning the camera. Under these conditions, scan mirror 138 will be disposed in position 282. Hence, the television optical path will traverse between the planar sheet adjacent plate 280 and lens 154, being reflected therebetween by scan mirror 138. Since the full lengths of successive printed lines of the "story" are displayed as comparatively large and easily read characters upon the screen, the only apparent motion on the screen will be the vertical advance of the continuous sheet of paper, which advance is at a comfortable reading speed.

Provision is also made for reverse or generally downward return movement of the sheet across the plate 280 and back to the storage station 182 to accommodate subsequent televising of the same "story" at least one additional time, in a manner as will be later explained. During such mentioned reverse travel, the scan mirror 138 will be disposed in position 288 (FIGURE 8). Consequently the television optical path will traverse between plate 290, disposed at a still image station 292, and lens 154 being reflected therebetween by scan mirror 138. The still image station 292 is adapted to accept message posters, or comprises a translucent screen upon which film slides may be projected, etc., for the purpose of advertising, station identification and the like.

Provision is also made for discarding a "story" along path segment 294, after it has been televised at scanning station 228, the discarded portion of the sheet ultimately coming to rest at discard station 296 or being severed and thrown away.

Hence, using the present invention, information may be televised through utilization of a single television camera from any one of three locations, i.e. at the printing station as news is printed, at the scanning station where news is later televised, and at the still image station.

*Scan mirror positioning.*—As previously mentioned, scan mirror 138 may be selectively disposed in any one of three positions, i.e. 140, 282, and 288 (FIGURE 8). This selective positioning of scan mirror 138 is best understood in the present embodiment by reference to FIGURES 1, 8 and 9. As previously mentioned, scan mirror 138 is maintained in position 140 (FIGURE 8) when solenoid 142 (FIGURE 9) is energized, mirror 138 being removed from the field of view of the camera 124 to accommodate televising of information as it is being printed.

To position scan mirror 138 in the televising position 282 (FIGURE 8) plunger 144 is withdrawn from the field magnet of solenoid 142 (FIGURE 9), due to the force exerted by extension spring 150, which causes the long extension 302 of crank lever 148 to be rotated clockwise, as viewed in FIGURE 9. The crank lever 148, being non-rotatably connected to the scan mirror shaft 152, correspondingly rotates scan mirror 138, also non-rotatably secured to the scan mirror shaft 152, from mirror position 140 to mirror position 282 (FIGURE 8). A nub, which extends below arm 304 near the end of long extension 302 of lever 148, limits the upward travel of crank lever 148 so that position 282 is precisely attained. Arm 304 is rotatably joined to scan mirror shaft 152, the movement of arm 304 being restricted between upper and lower limits by adjustable eccentrics 306 and 308, which are suitably adjustably mounted to the frame 200. The center lower edge portion of arm 304 determines the upward limit of extension 302 of lever 148 and the position of scan mirror 138 during scanning. During forward scanning at scanning station 228 with scan mirror situated at position 282, a downward force is exerted at end 310 of arm 304 by a compression spring 312, having a spring force advantage over that of extension spring 150. Spring 312 is retained on push rod 314 by lock nuts 316 threadedly joined to the upper threaded end of push rod 314. The action of spring 150 correctly positions the scan mirror 138 through crank lever 148 and shaft 152 so that the camera will be accurately focused on an area coincident with the flat surface of plate 280.

As reverse movement of the paper across plate 280 is commenced, the scan mirror 138 is shifted from position 282 to position 288 to accommodate display of suitable picture at still image station 292. This is accomplished, with solenoid 142 de-energized, by actuating solenoid 300 (FIGURE 1). In this way, push rod 314 is caused to be elevated, thus reducing the downward force exerted by compression spring 312 sufficiently to be overcome by that of extension spring 150 bringing arm 304 into contact with eccentric 306. The lifting of the push rod 314 is, of course, a mechanical action transmitted through solenoid plunger 320, link 322, lever 324 (as it is pivoted about the center line of shaft 330) and finally through the push rod to 314 which is pivotally joined to lever 324 at 328. The elevation of arm 304 into direct contact with eccentric 306 accommodates a slight amount of additional clockwise rotation of crank lever 148 (FIGURE 9) again responsive to the tension exerted by spring 150. Thus, shaft 152 is correspondingly rotated to dispose the scan mirror 138 in position 288 (FIGURE 8). Hence, the full view of camera 124 is likewise shifted, as reflected off the surface of scan mirror 138 to a focal plane coincident with the plate 290 at station 292, where a poster card, a projected film slide, or the like is exhibited.

*Forward and reverse drive.*—An understanding of the forward and reverse drive systems is best acquired by reference to FIGURES 8, 10 and 13. The stored printed copy paper, which is routed from storage station 182 (FIGURE 8) along path 278 for display at scanning station 228, passes around shaft 330 and between reverse roller 332 and pressure pad 334 which is integrally joined at one edge to shaft 330. During forward movement of the sheet, the pressure pad 334 is spaced a small distance away from the sheet, which sheet is contiguous with adjacent surface of the reverse drive roller 332. Thereafter, the sheet passes across and parallel to plate 280, between forward drive roller 336 and pressure pad 338 (which firmly exerts force upon the paper against the adjacent surface of the forward drive roller 336 during forward displacement of the sheet), and downward between forward drive roller 336 and shaft 340 along path segment 294 to be deposited at discard station 296. As shown shown by the partly exploded perspective view of FIGURE 10, gear motor 339, suitably mounted to the frame of the apparatus, furnishes driving power to forward roller 336. Specifically, the output shaft 342 of motor 339 drives forward roller shaft 344 counterclockwise through flexible coupling 346 when the field winding of gear motor 339 is energized.

Reverse drive power is likewise furnished by clockwise rotation, as viewed in FIGURE 10, of the output shaft (not shown) of frame mounted reverse drive gear motor 348 which drives reverse roller shaft 352 through flexible coupling 350 when the field winding of gear motor 348 is energized. Only one of the two gear motors is ever energized at any one particular time, and sometimes both are idle.

The rate at which the copy paper is transported across plate 280, in either the forward or the reverse direction, is determined by the respective rotational speeds of the output shafts of gear motors 339 and 348. Preferably reverse gear motor 348 drives the copy sheet in a reverse direction at a somewhat faster rate than does motor 339 in a forward direction, the latter speed preferably being at a comfortable reading speed. Motors 339 and 348, respectively, may be motors Nos. 131745 and 131746 manufactured by Mercle-Korff, 213 Morgan St., Chicago, Ill.

Drive-relation between the copy sheet and the forward drive roller 336 is accommodated by friction created between the elastomeric roller 336 and the back surface of the sheet enhanced by force of pressure pad 338 against the sheet.

Linkage (shown in FIGURE 1) controls the relative arcuate position of shaft 340, and, accordingly, the pressure pad 338 is positioned in either its operative or its inoperative position. More specifically, during forward scanning of the sheet at scanning station 228, lever 324 (FIGURE 1) is held in a downward position accommodated by solenoid 300, plunger 320 and link 322. Thus, lever 324 has been rotated relative to the longitudinal center line of shaft 330 in a counterclockwise direction as viewed in FIGURE 1 through an arc distance limited by the outermost excursion of the solenoid plunger 320 by force of an extension spring 354 interposed between the lever 324 and the frame of the apparatus. This arcuate displacement simultaneously disposed pressure pad 334 in slightly spaced relation with respect to the copy sheet which passes around the surface of roller 332 because shaft 330 is non-rotatably secured to lever at 324, and pressure pad 338 is in contiguous relation with sheet so as to insure satisfactory frictional engagement between the sheet and the roller 336 for advancing the sheet.

Specifically, the lever at 324 is joined, by pivotal union 355 to turnbuckle linkage 356 and at 357 to arm 358 (FIGURE 1). Arm 358 is non-rotatably secured to shaft 340. Thus, during forward scanning of the sheet at scanning station 228, lever 324 will be in its most counterclockwise position, as viewed in FIGURE 1, causing both shafts 330 and 340 to assume their maximum counterclockwise positions. This spaces pressure pad 334 from the sheet and at the same time causes pad 338 to exert a force against the copy sheet to accommodate friction drive of the sheet across the scanning station while motor 339 receives power.

When the televising of a given "story" at the scanning station has been completed and the "story" is to be returned, in a reverse or downward direction across plate 280, solenoid 300 is energized as power is shifted from field coil of forward gear motor 339 to that of reverse gear motor 348. Energization of solenoid 300 lifts lever 324, i.e. in a clockwise direction as viewed in FIGURE 1, about the longitudinal axis of shaft 330 a distance determined by the bottoming of the plunger 320 within the field magnet of solenoid 300. This jointly rotates shafts 330 and 340 clockwise through the maximum arc-distance. Consequently, the forward pressure pad 338 is displaced so as to be slightly spaced from the copy sheet and the pressure pad 334 is correspondingly displaced into continuous pressurized engagement with the copy sheet accommodating friction reverse drive as motor 348 rotates roller 332.

At the same time, as previously explained, push rod 314 is elevated, by the mentioned clockwise rotation of lever 324, to reposition the scan mirror 138 into position 288 (FIGURE 8) for televising of information from the still image station 292. Thus, the copy sheet is displaced in a reverse direction, preferably at a rapid speed, until the beginning of the "story" is disposed adjacent plate 290.

*Indicia sensing.*—An indicia-sensing apparatus is provided at the scanning station 228 for sensing the "story"-identifying marks placed on the sheet by ink dispenser 230 (as explained earlier). The indicia-sensing apparatus, generally designated 360 (FIGURE 11) comprises a source of light 362 (which in conjunction with reflector shield 364 (FIGURE 1) illuminates both scanning station 228 and still image station 292), a pair of apertures 366 (FIGURE 10) in plate 280 and a pair of photo 366 (FIGURE 10) in plate 280 and a pair of photo conductive cells 368 of known type, which are in electrical communication with the logic circuit. One suitable type of photo-conductive cell is catalog No. CL603AL manufactured by Clairex Corp. of New York, N.Y. If desired, one aperture and one photo-conductive cell may be used. The advantage of two apertures and two photoconductive cells is that indicia-sensing apparatus 360 cannot be erroneously activated by a blemish, such as a smudge, upon the sheet.

Functionally, the indicia-sensing apparatus 360 senses the previously mentioned "story"-identifying ink marks or stripes disposed at one margin along the sheet to cause the sheet (a) to be driven in a forward direction by gear motor 339, (b) to be driven in a reverse direction by reverse gear motor 348 and (c) to disable gear motor 348 when it would otherwise be operable to accommodate discarding of an unwanted "story" as additional printed information becomes available.

The photo-conductive cells 368, as shown in FIGURE 11, differentiate at their respective light-sensitive element the intensity of light emanating from source 362 and passing through apertures 366 (FIGURE 12) as permitted by the translucent qualities of the paper stock which is displaced between the light source and the photo conductive cells 368. When a given light-obstructing mark, which identifies the end of a "story" is interposed between the light source and both photo conductive cells and over both apertures 366, the intensity of light sensed by cells 368 will be reduced. Upon sensing the ink mark, the electrical resistance of photoconductive cells 368 is changed furnishing an electrical pulse to the logic circuitry causing forward displacement of the paper to cease and reverse displacement to be initiated, thereby causing the beginning point of the previously televised "story" to be returned to a positive adjacent plate 280. When the beginning of the story is so returned to station 228, another "story"-identifying ink mark becomes disposed over both apertures 366 causing another electrical pulse to be initiated by the photo conductive cells 368 to the logic circuitry thereby either causing the paper to again be driven in a forward direction across the scanning station 228 for televising, or causing the sheet to stop.

Paper metering assembly 190, previously described, measures the accumulation of paper length after each "story" identifying mark is placed on the paper margin. Upon reaching a predetermined minimum sheet length, for example 30 inches, the closure of the contacts of metering switch 226 disables the indicia sensing apparatus 360 so that the next light-obstructing mark to pass in a forward direction over apertures 366 is not sensed. Thus a "story" is ejected from the scanning station 228 along path segment 294 and becomes discarded information at station 296 (FIGURE 8).

LOGIC CIRCUITRY

The presently preferred logic circuitry, shown in FIGURES 13–18, inclusive, serves to electrically interconnect various sensing and actuating devices previously described to permit proper automatic control during all modes of operation. Of course, it is to be appreciated that other electrical configurations can be used without departing from the scope of the present invention. Three sensing devices are used in the illustrated embodiment. These comprise: (a) a sequential selector which detects predetermined telegraphic code signals to control the operational mode of the present system, and accordingly, holds the printer 20 (FIGURE 1) in an inoperative condition during the scanning mode; (b) the paper metering assembly 190 (FIGURE 6) which measures the accumulated length of paper discharged by the printer 20 (FIGURE 1) into storage loop 182 (FIGURE 8) and; (c) a pair of photo conductive cells 368 (FIGURE 11) which, in conjunction with lamp 362, sense the presence of an ink indicia stripe at scanning station 228.

Electrical information is furnished by the mentioned sensing devices to the logic circuitry which in turn properly actuates the various solenoids and drive motors during printing and televising of facsimile information. The mechanisms so actuated comprise: (a) solenoid 142 (FIGURE 7), which, upon being energized, rotate mirror 138 to position 140 (FIGURE 8) thus removing it from the optical path of camera 124 to permit direct viewing of printed material as it is typed by printer 20 (FIGURE 1); (b) solenoid 246 (FIGURE 7), which being momentarily energized at the end of each printed story, causes ink roller 232 to contact the printed sheet while rod 250 is depressing the second vane of vanes 22 (FIGURE 1) and, further, causes notch 216 of metering wheel 212 to be returned to the zero length position, as shown in FIGURE 6; (c) solenoid 300 (FIGURE 1) which being, energized during the reverse cycle of the scanning mode, brings pressure pad 334 (FIGURE 8) into contiguous engagement with the copy sheet passing over reverse roller 332 while shifting mirror 138 to position 228 for televising of still image station 292; and (d) forward and reverse gearmotors 339 and 348, respectively, (FIGURE 10) which, through associated drive rollers 336 and 332, appropriately transport the copy paper in two directions through scanning station 228 for repeat televising by camera 124.

Reference is now made to FIGURES 13 through 18 to describe in detail the operation and configuration of the presently preferred logic circuitry, with the blocks of FIGURE 13 being further defined by the electrical schematic of FIGURES 14 through 18. All switched control voltage is returned to the source through ground or a common buss and, being a practice well known in the art, no reference is made to these electrical conductors in the following explanation.

Latching circuit 379 (FIGURES 13 and 14) primarily comprises a two-coil latching relay, which selects between the print and scan modes of televising. This relay may be of any suitable type, relay KB17DG, manufactured by Potter Brumfield of Princeton, Indiana, being one satisfactory relay. This relay comprises four sets of contacts each having a single pole which may be alternately maintained in one of two positions. The relay is electromagnetically actuated and mechanically maintained in the position coincident with a current pulse through the respective associated coils 380 and 382. Momentarily energizing the magnet coil 382 causes all contacts to be latched in the scan position. Alternatively, a current pulse through coil 380 initiates a maintained contact closure for the print mode, i.e. to the position depicted in FIGURE 14.

During the print mode, contact 388 of latching circuit 379 connects a compatible voltage source (not shown), through leads 387 and 389 to solenoid 142 (FIGURE 13) rotating the scan mirror 138 to position 140 outside the camera optical path. As paper metering wheel 212 is advanced by platen rotation during printing bringing notch 216 into alignment with platen shaft 156, switch 226 is closed. Thus, capacitor 390 (FIGURE 14) is charged rapidly, to a voltage approaching that of the source, through switch 226, lead 394 (FIGURE 13) and contact 393 (FIGURE 14). Discharge of capacitor 390 initiates placement of an identifying ink mark on the paper margin in a manner to be more fully explained subsequently.

The relay used in conjunction with the marking circuit 378 is of conventional design. For example, relay TF154–4C, manufactured by Allied Control of New York City, New York. The associated contacts of the relay of circuit 378 are electromagnetically maintained from their respective normal positions only while the magnet coil is energized. The relay of circuit 378 as well as the relay of circuit 375 and 376 may be of suitable commercially available type, for example, relay TF154–4C manufactured by Allied Control of New York, New York. To best describe the operation of the marking circuit 378 shown schematically in FIGURE 15, it is assumed that a sufficient length paper has passed through the printer to cause the electrical contacts of switch 226 (FIGURE 13) to close. This in turn charges capacitor 390 (FIGURE 14) as previously explained. As the latching circuit relay coil 382 is momentarily energized, immediately following the printing of a story, capacitor 390 is discharged through contact 391, lead 392 (FIGURE 14) and further through the series resistance of resistor 440 (FIGURE 15) and the parallel combination of resistor 441 and the base/collector junctions of transistors 442 and 443. Base/collector current in turn causes both transistors to conduct an amplified current through their respective emitter and collector layers, being furnished from a supply source (not shown) through lead 446 and relay coil 444 (FIGURE 15). The amplified emitter current of transistor 442 must also flow through the base layer of transistor 443 thus the total current of coil 444 is amplified by the combined gain of both transistors.

A momentary closure of contact 449, as a result of current passing through coil 444, connects ink marking solenoid 246 (FIGURE 13) through lead 447 (FIGURES 13 and 15) to a compatible power source (not shown) bringing ink roller 232 into contact with the paper at the printer platen. The actuation of solenoid 246 further causes the second vane 22 to be mechanically depressed, by washer 258, stimulating a line feed function by the printer. Contact 450 (FIGURE 15), having been maintained in electrical communication with lead 452 during the print mode, is opened coincident with the actuation of solenoid 246 thereby electrically disconnecting the telegraph signal line from the printer. This prevents interference between the simulated line feed, just described, and incoming signals. A series of line feed functions as executed in rapid succession thus cause the ink roller to deposit a stripe of ink along one margin of the paper, the stripe being of a length determined by the discharge time of capacitor 390 (FIGURE 14). The relay contacts of marking circuit 378 (FIGURE 15) are of course restored to normal when capacitor 390 becomes discharged to a point where base current ceases to flow in transistors 442 and 443.

In addition to the placing of an identifying ink mark on the paper sheet, solenoid 246 also lifts metering wheel 212 (FIGURE 13) from engagement with platen shaft 156 resetting it to zero length position and restoring the contacts of switch 226 to a normally opened condition. This insures that the ink marking operation just described will not reoccur before a specified minimum length of paper has passed the printer platen 120.

The relay used in conjunction with the bistable circuit 377 is an impulse actuated device utilizing a single coil to alternately select one of two contact positions to then be maintained by mechanical toggle action. One relay suitable for such use is relay WD 3528–2, manufactured by Comar Electric of Chicago, Illinois. During the scan mode of operation, which accommodates delayed televising of printed information, the bistable circuit 377, (shown in FIGURE 16), determines the direction of paper travel through scanning station 228. The relay contacts are shown in the forward scan position in FIGURE 16. A suitable voltage is connected from lead 384 to lead 385 through contact 386 of the latching circuit (FIGURE 14) which is selectively electrically passed respectively through contact 400 and lead 401, and contact 402 and lead 403 (FIGURE 16) to the forward and reverse gearmotors 339 and 348 respectively, shown in FIGURE 13. This same voltage is also furnished at various other times from the photo cell circuit 376 (FIGURE 17) and the discard circuit 375 (FIGURE 18), as will be explained later.

Gearmotor supply voltage is connected through lead 385, contact 400 and lead 401 (FIGURE 16) thus providing electrical power to forward gearmotor 339, which in turn rotationally drives roller 336 (FIGURE 13) to advance the paper sheet in a forward direction. Upon sensing an ink stripe along the paper margin, the photoconductive cells 368 and the associated circuitry 376, (FIGURE 17) supply a pulse of current through relay coil 405 (FIGURE 16) by way of lead 399. This momentary energizing of coil 405 causes a reversal of paper travel by switching the gear motor supply voltage to supply power through contact 402 and lead 403 to reverse gearmotor 348 (FIGURE 13). The subsequent sensing of an ink stripe as the sheet is displaced in the reverse direction will likewise return the relay contacts of circuit 377 to the forward drive position, thus accommodating repeat televising of a single story as described previously.

Reverse solenoid 300 (FIGURE 13), being connected in parallel with, and having an operating voltage compatible with that of reverse gearmotor 348, is energized during the return of a given story to its beginning. Solenoid 300, as has been explained, controls the relative position of pressure pads 334 and 338 alternately bringing them into contiguous engagement with the paper sheet respectively over rollers 332 and 336. The actuation of solenoid 300, during the reverse cycle of the scanning mode, serves to position mirror 138 so that the television camera field of view is shifted away from the scanning station onto still image station 292.

During reverse cycle of the scan mode, capacitor 395 of the latching circuit 379 (FIGURE 4) is charged to a potential nearly equivalent to that of a power source (not shown) connected to contact 410 by lead 411 (FIGURE 16) through lead 397, contact 396 and resistor 404 (FIGURE 14). Capacitor 395 is discharged through the same conductive path and further through contacts 408 and resistor 407 (FIGURE 16) during the forward cycle. However, when coil 380 of the latching relay in circuit 379 (FIGURE 14) is energized to initiate the print mode during a reverse cycle of the scan mode, capacitor 395 will discharge rapidly through resistor 404, contacts 398, lead 399 (FIGURE 14), and coil 405 (FIGURE 16). This discharge current actuates the bistable relay of FIGURE 16 returning it to the forward position. This is to insure that stories may be subsequently discarded in the forward direction, as additional material is printed, as will be more fully explained later.

The primary function of the photo cell circuit 376, shown schematically in FIGURE 17, is to detect the presence of the light-obstructing ink marks on the paper margin as the paper passes through the scanning station. As previously explained, this is accomplished by a reduction in the light level which normally reaches the photoconductive cells 368 through the somewhat translucent sheet. Upon sensing a story-identifying mark, circuit 376 in turn causes the direction of paper travel to be reversed through operation of the bistable circuit 377 of FIGURE 16, as explained above. It should also be noted that in the present embodiment where two cells 368

(FIGURE 17) are used they are placed in line, along the length of the paper sheet and the ink stripe, and are suitably spaced from each other, for example, on the order of approximately one inch centers. Both cells must be in the same condition (light or dark) before the circuit is actuated. Thus, this arrangement is advantageous over that of a single photo-cell in that it does not respond to ink smudges which might occur in the storage loop and further is unaffected by voids which may occur in the ink stripe due to a delayed restoration feature to be explained.

Referring now to FIGURE 17, the photocell circuit 376, photo cells 368, when receiving light, are maintained at a relatively low value of resistance, compared to the resistance of resistor 413, thus presenting a positive voltage to the base of transistor 417 with respect to the supply potential at the emitter. Capacitor 416 is slowly charged through resistor 414 to a potential nearly the same as that at tap 422 of resistor 413, with diode 415 being relatively nonconductive to current flow in this direction. The positive base potential of transistor 417 in turn causes a base/emitter current to flow, further permitting an amplified current flow between the emitter and collector layers which are in series with resistor 418. The voltage division between the collector, in this conducting state and resistor 418 creates a reverse bias applied between the base/emitter junction of transistor 420 through resistor 419. Consequently, collector current is not permitted to flow and the associated relay coil 421 remains de-energized.

As a light-obstructing ink mark is passed between photo cells 368 and their light source, the series resistance of the photo cells, in parallel combination, is substantially increased. Both cells, being dark, will result in a rapid discharge of capacitor 416 toward the negative source voltage through tap 422, a portion of resistor 413 and diode 415. Diode 415, now being conductive, offers a relatively low resistance to the discharge of capacitor 416 when compared to resistor 414. This more negative potential now at the base of transistor 417 causes collector current flow to cease through transistor 417, its base having been reverse biased, and, in turn, established a forward bias between the base/emitter junction of transistor 420 through resistor 419. A current flow of amplified magnitude through the collector and emitter layers of transistor 420 causes relay coil 421 to be energized. The mentioned slow charge/fast discharge path for capacitor 416 through the parallel combination of diode 415 and resistor 414 delays the recovery or restoration of the circuit once the ink stripe has past and the light source again brings the photocells 368 to the "light" condition. This renders the circuit substantially immune to light-passing voids which may possibly occur in an ink stripe.

Relay contact 426 furnishes motor voltage from a compatible power source (not shown) to the bistable relay contacts 400 and 402 (FIGURE 16) through leads 384 and 385, when coil 421 (FIGURE 17) is energized coincident in time with the sensing of an ink stripe by photo cells 368. This is to insure that paper travel will not be discontinued while a mark is being sensed by the photocells, i.e. advance will continue, as a story and its associated ink stripe are displaced in a forward direction at least until the ink stripe is positioned beyond the photo cell area of the scanning station.

While relay coil 421 is de-energized (while no ink stripe is being sensed), capacitor 430 is maintained in a charged condition being connected to a compatible power source (not shown) through lead 427, contact 428 and resistor 425. Lead 429 is furnishing the same potential to be used in conjunction with the holding contact 436 of the discard circuit 375 (FIGURE 18), as will be more fully explained later. Each time relay coil 421 is energized, coincident with ink stripe sensing by the photo cells 368, capacitor 430 is rapidly discharged through contact 431, lead 432, (FIGURE 17) to the discard circuit 375 (FIGURE 18). The discard circuit in turn selects a discharge path through either contact 434 and resistor 435 or contact 433, lead 399 to the relay coil 405 of bistable circuit 377 (FIGURE 16). Thus, if a story is to be televised repeatedly, the discharge of capacitor 430 is routed through the bistable relay coil 405 to reverse the direction of paper travel as previously described. Conversely, if the discard circuit relay (FIGURE 18) is energized, capacitor 430 (FIGURE 17) will be discharged through resistor 435. This prevents reversal of paper travel by circuit 377. Thus, return of the story will be discarded at discard station 296.

When the contacts of metering switch 226 (FIGURE 13) are closed, due to platen 120 having passed sufficient length of paper in the print mode to drop notch 216 over platen shaft 156, a suitable voltage is applied through the contacts of switch 226 to lead 394 (FIGURES 13 and 18) of the discard circuit 375. This voltage causes a charging current to pass through capacitor 438 (previously discharged by resistor 437), diode 439 and relay coil 440, energizing the relay. A voltage source connected to lead 429 from the photo cell circuitry will hold relay 440 closed even though the initial charging through diode 439 is substantially diminishing as capacitor 438 becomes fully charged. The relay of circuit 375 is now prepared to discard the next ink mark, and the corresponding story, and will not be reset until a subsequent ink stripe passes the photo cells. As this occurs, contact 431 (FIGURE 17) is closed discharging capacitor 430 through lead 432 and further through contact 434 and resistor 435 (FIGURE 18). This removes the holding voltage from lead 429 and thus from coil 440. Resistor 437 is of relatively high resistance when compared to that of relay coil 440 and, hence, cannot supply adequate current with capacitor 438 charged to hold coil 440 fully energized.

Voltage is supplied to the forward gearmotor 339 through the bistable circuit 377 (FIGURE 16) through lead 384 contact 441 and lead 385 (FIGURE 18) while the discard circuit 375 is set to discard. Only the forward motor 339 may operate during discarding due to the fact that the bistable relay (FIGURE 16) is actuated when the initiation of the print mode interrupts the scanning mode when operating in the reverse cycle.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. In a method of televising information, the steps of: printing characters comprising said information at a printing station upon a comparatively broad web as vertically-spaced lines comprising several characters each, displacing the character-containing web to a storage station remote from said printing station, insuring that a predetermined amount of web is thereafter stored at the storage station, subsequently displacing the web from the storage station unidirectionally across a scanning station at a predetermined reading speed, sensing web-carried indicia signifying the beginning of a story, directing a television camera upon the scanning station, scanning the printed image disposed at the scanning station by use of the television camera, restricting the movement perceptible on a television screen to apparent vertical web displacement, sensing web-carried indicia signifying the end of the story, directing the television camera away from the scanning station, and displacing the web in a reverse direction until the beginning of the story is again disposed at the scanning station whereby a given story may be televised a plurality of times.

2. In an apparatus for televising information received in the form of telegraphic code signals as the information is printed in spaced lines upon a web by a telegraph page printer comprising printer platen means adapted to shift between lower and upper case print positions, televising means having a field of view comprising the portion of the web subjected to the fore and aft displacement along the length of the web in response to shifting of the platen means between said print positions, and means to compensate for the fore and aft displacement of the web caused by the shifting movement of the printer platen means whereby the printed characters being televised appear in combination as an essentially stationary picture when a given line of information is being printed at the platen means using both lower case and upper case print positions.

3. In an apparatus for televising information received in the form of telegraphic code signals as the information is printed as spaced lines by a telegraphic page printer comprising printer platen means adapted to shift between lower and upper case print positions, televising means, and means to compensate for the shifting movement of the printer platen means comprising mechanical linkage joining said platen means to a reflective mirror by which the televising means views the printed information as it is printed whereby shifting of the platen means between upper case and lower case print positions correspondingly alters the angle at which said mirror is disposed so that the printed characters being televised appear in combination as an essentially stationary picture when a given line of information is being printed at the platen means using both lower case and upper case print positions.

4. In a method of changing the format of the print out of telegraphic signals to accommodate displaying of relatively large and easily readable printed characters upon a television screen, the steps of: telegraphing code signal information to a telegraph receiving station in a conventional manner, printing each telegraphically transmitted line of information upon a sheet as at least two vertically spaced lines of characters, and televising the printed lines of characters for display upon a television screen.

5. A method as defined in claim 4 wherein the mentioned printing step comprises simultaneously executing a carriage return and a line feed at said telegraph receiving station without operator assistance at a point in time when a conventionally transmitted line of information is in the process of being received, solely responsive to reception of the first space code signal following printer carriage displacement to a predetermined print position, and accommodating overtravel beyond said predetermined position as the space code signal is sought.

6. In an apparatus for printing telegraphic information as characters on a long sheet and for periodically televising quantities of the printed information at later points in time, means to accommodate continuous televising of a story comprising a quantity of printed information during any one televising period comprising means to place indicia on said sheet at the beginning and end of each said story as said story is printed, metering means (a) operative to measure at least a predetermined minimum length of said sheet containing one said story and (b) thereafter substantially inoperative when and if any additional information comprising one said story is printed, and means cooperating with said metering means and rendering said indicia placing means effective to define each said story.

7. In an apparatus for printing telegraphic information as characters on a long sheet and for periodically televising quantities of the printed information at later points in time, means to accommodate continuous televising of a story comprising a quantity of printed information during any one televising period comprising means to place indicia on said sheet at the beginning and end of each said story as said story is printed, said indicia placing means comprising an ink dispenser with an applicator and said indicia comprising light-obstructing ink stripes disposed at one margin of said sheet, metering means (a) operative to measure at least a minimum length of said sheet containing one said story and (b) thereafter substantially inoperative when and if any additional information comprising one said story is printed, said metering means comprising a notched metering wheel which wheel when operative during printing rotates in response to rotation of printer platen means and becomes and remains idle when said notch cooperates with said printed platen means, and means cooperating with said metering means and rendering said indicia placing means effective to define each said story, said cooperating means comprising linkage means and electrical means including a switch and a solenoid to displace said linkage means bringing the ink applicator into contact with said sheet to deposit an ink stripe.

8. In a method of displaying characters upon a television screen as the characters are printed as successive lines at a telegraph receiving station so as to avoid televising of platen movement consequential of shifting between upper and lower case print positions comprising changing at least part of the optical path traversed by a light beam image of printed characters en route to being picked-up by a television camera in essential synchronism with the shifting of the platen between lower and upper case print positions whereby the televised pictured appears to be essentially immobile upon the television screen as each line is printed.

9. A method as defined in claim 8 wherein said changing step includes varying the angular position of a reflective surface between two locations.

10. In a method of televising printed information, the steps of serially telegraphing code information to a telegraph receiving station as conventional lines of signals, altering the print out of each said line of signals to produce therefrom exactly two spaced short lines of printed characters disposed upon a sheet one above the other, exposing the short lines, which are disposed one above another upon the sheet, to the field of view of a television camera and televising the full length of several spaced short lines at any one point in time for display upon a television screen as easily readable, comparatively large characters.

11. In a method of identifying a quantity of information to be televised from a scanning station, comprising printing said information at a printing station upon an elongated web as spaced lines of characters, automatically placing indicia upon the web identifying the beginning and the end of said quantity of information, displacing the indicia-carrying web from the printing station to a storage station, accumulating a length of web at the storage station, thereafter displacing the stored web across the scanning station, initiating televising of said quantity of information responsive to sensing said indicia identifying said beginning, and terminating televising of said quantity of information responsive to sensing of said indicia identifying said end.

12. A method as defined in claim 11 further including the steps of: returning said beginning to the scanning station while televising subject matter located apart from said scanning station, said subject matter comprising identification, advertising, and like information.

13. In an apparatus for depositing printed information upon a sheet as spaced short lines and for displaying said short lines of information upon a television screen as relatively large and easily perceptible characters, telegraph page printer means for receiving conventional telegraphic lines of information comprising coded signals, said printer means comprising means executing printer-carriage return and line feed functions a plurality of times during receipt of each conventional line of telegraphic signals without operator assistance whereby two or more short lines of printed information are created during receipt of each conventional line of telegraphic signals, and televising means for full viewing the short lines of information and displaying the characters thereof upon said television screen.

14. An apparatus as defined in claim 13 wherein said executing means comprises means carried by the reciprocating printer carriage and adapted to resiliently cooperate with actuating means carried by the printer accommodating displacement of bail means to actuate printer structure thereby executing carriage return and line feed at least once at a point in time intermediate reception of the beginning and reception of the end of a conventional line of telegraphic signals.

15. An apparatus as defined in claim 14 wherein said means carried by the carriage comprises a spring-biased rod and said actuating means comprises a bracket displaceable when resiliently engaged by said rod.

16. In a method of displaying printed information upon a television screen including the steps of: printing telegraphically-received information upon a strip medium as vertically spaced lines, measuring a predetermined length of the strip medium having a minimum limit as the medium is displaced through a telegraph receiving station, placing optically-identifiable indicia along one edge margin of the medium to mark the beginning and end of said measured length of the medium, and storing the indicia-carrying medium for later televising of a measured length of printed information.

17. A method as defined in claim 16 wherein said placing step comprises marking the medium with light-obstructing substance.

18. In an apparatus for televising information printed as characters upon a long sheet, means for storing the printed sheet, means including televising means for accommodating scanning of said printed information at an essentially planar location and successively operable forward and reverse sheet drive means to accommodate forward and reverse displacement of said sheet across said planar location whereby a given portion of said printed information may be televised a plural number of times after being printed.

19. An apparatus as defined in claim 18 wherein said drive means comprise a motor-driven forward drive roller, a motor-driven reverse drive roller, and means for concurrently disabling either one of said motor-driven rollers and enabling the other said roller.

20. In an apparatus for televising information printed as characters upon a long sheet, means for storing the printed sheet, means including televising means for accommodating scanning of said printed information at an essentially planar location, successively operable forward and reverse sheet drive means to accommodate forward and reverse displacement of said sheet across said planar location whereby a given portion of said printed information may be televised a plural number of times after being printed, said drive means comprising a motor-driven forward drive roller, a motor-driven reverse drive roller, and means for concurrently disabling either one of said motor-driven rollers and enabling the other said roller, and a separate pressure pad cooperating with each said drive roller, either one of said pads being displaceable between an operative position and an inoperative position as the other pad is jointly displaced between an inoperative position and an operative position, the operative position of each pad causing the operative pad to exert a pressure force upon said sheet and against the adjacent drive roller.

21. In an apparatus for television information printed as characters upon a long sheet, means for storing the printed sheet, means including televising means for accommodating scanning of said printed information at an essentially planar location, successively operable forward and reverse sheet drive means to accommodate forward and reverse displacement of said sheet across said planar location whereby a given portion of said printed information may be televised a plural number of times after being printed, and viewing means including a stationary image location, means interrupting viewing of the planar location by the televising means and causing the televising means to view the stationary image location.

22. In an apparatus for televising information printed as characters upon a long sheet, means for storing the printed sheet, means including televising means for accommodating scanning of said printed information at an essentially planar location, successively operable forward and reverse sheet drive means to accommodate forward and reverse displacement of said sheet across said planar location whereby a given portion of said printed information may be televised a plural number of times after being printed, and wherein said sheet carries indicia which identifies the beginning and end of a predetermined quantity of information printed upon the sheet and comprising indicia reading means which sense the beginning indicia to actuate the forward drive means for advancing the sheet across the planar location and which sense the end indicia to actuate the reverse drive means to accommodate reverse sheet movement across the planar location.

23. An apparatus as defined in claim 22 wherein said indicia comprises substantially opaque marks and said indicia reading means includes light-sensitive photocell means and a source of illumination directed through said sheet upon said photocell means whereby displacement of said sheet interposes said marks between said source of illumination and said photocell means to reduce the intensity of light sensed by the photocell and thereby accommodate said forward and reverse sheet movement.

24. An apparatus as defined in claim 22 comprising means for disabling said indicia reading means to accommodate discarding of unwanted quantities of printed information.

25. In a method of televising information disposed as characters upon a long sheet comprising the steps of: displacing the sheet unidirectionally through a printing station as said characters are placed upon the sheet, selectively displacing said sheet through a scanning station first in a forward direction and later in a reverse direction, and optionally televising printed information as it is (a) printed at the printing station and (b) displaced in a forward direction through the scanning station.

26. In an apparatus for printing telegraphic information upon a long web and for selectively displaying portions of said printed information on a television screen, comprising seriatim a printing station, a printed web storage station, a scanning station and further comprising televising means to view portions of said printed web and to enable the same to be displayed upon the television screen and means selectively operable to optically control which printed information is to be scanned by the televising means, printed information located at the printing station and at the scanning station being selected at different times for display upon the screen.

27. In an apparatus for printing telegraphic information upon a long web and for selectively displaying portions of said printed information on a television screen, comprising seriatim a printing station, a printed web storage station, a scanning station and further comprising televising means to view portions of said printed web and to enable the same to be displayed upon the television screen and means selectively operable to optically control which printed information is to be scanned by the televising means, printed information located at the printing station and at the scanning station being selected at different times for display upon the screen, and further comprising a still image station containing readable information and wherein said selectively operable means optically shifts the optical path of the televising means between said printing station, said scanning station and said image station for selective viewing of readable information at said three stations at different points in time.

28. In a method of displaying information comprising printed characters upon a television screen including televising information from each of three stations at separate time intervals using a single television camera comprising the steps of selectively directing the optical path of said camera (a) upon a printing station as printed characters are being placed upon a web, (b) upon a scanning station as a portion of said character-containing web is withdrawn from storage and moved across said scanning station and (c) upon a display station at which a stationary picture is located.

29. In an apparatus for televising information printed as characters upon a sheet, the sheet being marked in selected locations with optically-identifiable indicia, televising means, forward and reverse drive means, and indicia reading means for sensing the indicia thereby controlling the direction of sheet travel, said indicia reading means comprising illumination means passing light selectively upon indicia and through said sheet upon at least two spaced light-sensitive means whereby only indicia and not blemishes, smudges and the like are sensed to control the direction of sheet travel.

References Cited by the Examiner

UNITED STATES PATENTS

| | | | |
|---|---|---|---|
| 2,174,339 | 9/1939 | Weller | 178—42 X |
| 2,420,029 | 5/1947 | Brady | 178—6.7 |
| 2,994,740 | 8/1961 | Conkwright et al. | 178—6 |
| 3,166,636 | 1/1965 | Rutland et al. | 178—24 |

OTHER REFERENCES

Radio-Electronics, vol. 35 (TK 6540 R24), September 1964, page 51.

NEIL C. READ, *Primary Examiner.*

T. A. ROBINSON, *Assistant Examiner.*